US012794762B2

(12) United States Patent
Kim et al.

(10) Patent No.: US 12,794,762 B2
(45) Date of Patent: Nov. 10, 2026

(54) ELECTRONIC DEVICE MANAGING CONTROLLED DEVICE AND METHOD FOR OPERATING THE SAME

(71) Applicant: Samsung Electronics Co., Ltd., Suwon-si (KR)

(72) Inventors: Namjin Kim, Suwon-si (KR); Sijae Kim, Suwon-si (KR); Sungmi Park, Suwon-si (KR); Jongman Park, Suwon-si (KR); Moohyun Shin, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 274 days.

(21) Appl. No.: 18/652,170

(22) Filed: May 1, 2024

(65) Prior Publication Data

US 2024/0388497 A1 Nov. 21, 2024

Related U.S. Application Data

(63) Continuation of application No. PCT/KR2024/003866, filed on Mar. 27, 2024.

(30) Foreign Application Priority Data

May 16, 2023 (KR) ........................ 10-2023-0063159
Jun. 23, 2023 (KR) ........................ 10-2023-0081067

(51) Int. Cl.
*H04L 41/0654* (2022.01)
*H04L 41/0631* (2022.01)

(52) U.S. Cl.
CPC ...... *H04L 41/0654* (2013.01); *H04L 41/0631* (2013.01)

(58) Field of Classification Search
CPC . H04L 41/0654; H04L 41/0631; H04L 12/28; H04L 41/0659; H04L 61/4511;
(Continued)

(56) References Cited

U.S. PATENT DOCUMENTS

2017/0070924 A1 3/2017 Wu et al.
2018/0279389 A1 9/2018 Kwag et al.
(Continued)

FOREIGN PATENT DOCUMENTS

CN 111262941 A 6/2020
CN 114567518 A 5/2022
(Continued)

OTHER PUBLICATIONS

Lynn et al, RFC 7558: Requirements for Scalable DNS-Based Service Discovery (DNS-SD) / Multicast DNS (mDNS) Extensions, IETF (Year: 2015).*

(Continued)

*Primary Examiner* — Andrew W Chriss
(74) *Attorney, Agent, or Firm* — Jefferson IP Law, LLP

(57) ABSTRACT

An electronic device including a transceiver, one or more processors, and memory storing instructions is disclosed. The instructions, when executed by the one or more processors, cause the electronic device to obtain first information indicating that a controlled device is in an offline state in which the controlled device is disconnected from a server, establish a device-to-device (D2D) connection with the controlled device, receive an error code related to the offline state of the controlled device from the controlled device through the D2D connection, determine a recovery method corresponding to the error code based on designated recovery policy information, and transmit, to the controlled device through the transceiver, a recovery command to instruct to (Continued)

recover a connection between the controlled device and the server based on the determined recovery method.

20 Claims, 22 Drawing Sheets

(58) Field of Classification Search
CPC ...... H04L 61/5076; H04L 67/51; H04W 4/70; H04W 4/80; H04W 76/14; H04W 84/18
See application file for complete search history.

(56) References Cited

U.S. PATENT DOCUMENTS

| | | | | |
|---|---|---|---|---|
| 2021/0176810 | A1 | 6/2021 | Chae | |
| 2021/0219373 | A1 | 7/2021 | Moon | |
| 2022/0210740 | A1 | 6/2022 | Park | |
| 2022/0322478 | A1 | 10/2022 | Ono | |
| 2022/0361094 | A1* | 11/2022 | Kim | H04W 48/16 |
| 2023/0141055 | A1 | 5/2023 | Kim et al. | |
| 2024/0334531 | A1* | 10/2024 | Guo | H04W 64/00 |

FOREIGN PATENT DOCUMENTS

| | | | |
|---|---|---|---|
| JP | 6921347 | B1 | 8/2021 |
| JP | 2022-155052 | A | 10/2022 |
| KR | 10-2006-0082039 | A | 7/2006 |
| KR | 10-1881786 | B1 | 7/2018 |
| KR | 10-2019-0065786 | A | 6/2019 |
| KR | 10-2047848 | B1 | 11/2019 |
| KR | 10-2021-0033749 | A | 3/2021 |
| KR | 10-2021-0092079 | A | 7/2021 |
| KR | 10-2022-0012054 | A | 2/2022 |
| KR | 10-2022-0097226 | A | 7/2022 |
| KR | 10-2022-0123981 | A | 9/2022 |
| KR | 10-2022-0152683 | A | 11/2022 |
| KR | 10-2501380 | B1 | 2/2023 |

OTHER PUBLICATIONS

Cheshire et al., RFC 6763: DNS-Based Service Discovery, (Year: 2013).*

Privet, page dated Apr. 7, 2022, accessed via Internet Archive Wayback Machine on Mar. 27, 2026 (Year: 2022).*

Extended European Search Report dated Dec. 16, 2025; European Appln. No. 24807342.1-1218 / 4668691 PCT/KR2024003866.

International Search Report with Written Opinion and English translation dated Jun. 21, 2024; International Appln. No. PCT/KR2024/003866.

* cited by examiner

ELECTRONIC DEVICE MANAGING CONTROLLED DEVICE AND METHOD FOR OPERATING THE SAME

CROSS-REFERENCE TO RELATED APPLICATION(S)

This application is a continuation application, claiming priority under § 365 (c), of an International application No. PCT/KR2024/003866, filed on Mar. 27, 2024, which is based on and claims the benefit of a Korean patent application number 10-2023-0063159, filed on May 16, 2023, in the Korean Intellectual Property Office, and of a Korean patent application number 10-2023-0081067, filed on Jun. 23, 2023, in the Korean Intellectual Property Office, the disclosure of each of which is incorporated by reference herein in its entirety.

TECHNICAL FIELD

The disclosure relates to an electronic device managing a controlled device and a method for controlling the same.

BACKGROUND ART

More and more services and additional functions are being provided through user terminals, e.g., smartphones, or other electronic devices. To meet the needs of various users and increase utility value of electronic devices, communication service carriers or device manufacturers are jumping into competitions to develop electronic devices with various features. Accordingly, various functions that are provided through electronic devices are evolving more and more.

As wireless communication technology develops, devices using artificial intelligence (AI) have been widely introduced. For example, home appliances connected over a network through Internet of things (IoT) technology may utilize artificial intelligence. The IoT technology may provide intelligent Internet technology services that create new values in human life by collecting and analyzing data generated by devices. Through the convergence and combination of existing Internet technologies and various industries, IoT technology may be applied to fields, such as smart homes, smart buildings, smart cities, smart cars, and smart home appliances.

Meanwhile, the home is equipped with various home appliances for user convenience. Various services have been proposed to make manipulation or control of home appliances more convenient by way of IoT technology. The home network technology may provide various services through the home network to users in the home. For example, the user may control various controlled devices constituting a home network (e.g., IoT technology-applied home devices) using a personal electronic device (e.g., a smart phone). The user may desire to receive more diverse services to control controlled devices. Accordingly, the development of various techniques for managing controlled devices reflecting the user's intention has been requested.

The user may execute a procedure (e.g., onboarding) for registering a controlled device in a network (e.g., cloud server) using her own electronic device (e.g., smartphone or wearable device) to control controlled devices (e.g., a television (TV), an air conditioner, a washer, a security camera, a lighting device, or a switch). The electronic device may control the controlled device to be registered in the server to thereby connect the controlled device to the user account. The electronic device may access the server and control the controlled device through a client application using the user account.

The electronic device may identify and control the state of controlled devices registered on the user account through the client application. When the controlled device may not normally be connected to the server, the controlled device may be displayed as offline state on the client application. The controlled device may be in the offline state due to various causes, such as device issues, network failures, cloud failures, or application failures. When the controlled device is displayed as offline, the electronic device may provide an offline guide popup using a plugin application. The offline guide popup may provide a general help guide, such as identifying the home network environment and identifying power plug.

When disconnection (e.g., offline) occurs due to a software failure in a controlled device (e.g., refrigerator) using constant power, connection recovery may not be achieved by power-on/off, but may rather require unplugging followed by plugging back. However, plugging in and out may be a hassle for built-in appliances, such as refrigerators. In such a case, to address the offline state of the controlled device, it may be needed to delete the controlled device and then re-register it in the server. However, the user may be ignorant of the exact help guide. For re-registration of a controlled device, a registration procedure needs to be performed after deleting the existing registration information. This way causes inconvenience to the user.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

Aspects of the disclosure are to address at least the above-mentioned problems and/or disadvantages and to provide at least the advantages described below. Accordingly, an aspect of the disclosure is to provide an electronic device managing a controlled device and method for controlling the same.

Another aspect of the disclosure automatically detects a context where a controlled device is disconnected from a server.

Another aspect of the disclosure recovers connection of an offline controlled device.

Another aspect of the disclosure automatically re-connects an offline controlled device to a server.

Another aspect of the disclosure is to provide the user with a guide corresponding to the cause of a controlled device being offline.

Additional aspects will be set forth in part in the description which follows and, in part, will be apparent from the description, or may be learned by practice of the presented embodiments.

In accordance with an embodiment of the disclosure, an electronic device is provided. The electronic device includes a transceiver configured to receive and transmit signals, one or more processors communicatively coupled with the transceiver, and memory storing instructions. The instructions, when executed by the one or more processors, cause the electronic device to obtain first information indicating that a controlled device is in an offline state in which the controlled device is disconnected from a server. The instructions, when executed by the one or more processors, cause the electronic device to establish a device-to-device (D2D) connection with the controlled device through the transceiver. The instructions, when executed by the one or more processors, cause the electronic device to receive an error code related to the offline state of the controlled device from the controlled device through the D2D connection. The instructions, when executed by the one or more processors, cause the electronic device to determine a recovery method corresponding to the error code based on designated recovery policy information. The instructions, when executed by the one or more processors, cause the electronic device to transmit, to the controlled device through the transceiver, a recovery command instructing to recover a connection between the controlled device and the server based on the determined recovery method.

In accordance with another aspect of the disclosure, a method performed by an electronic device is provided. The method includes obtaining, by the electronic device, first information indicating that a controlled device is in an offline state in which the controlled device is disconnected from a server. The method may comprise establishing, by the electronic device, a D2D connection with the controlled device. The method may comprise receiving, by the electronic device, an error code related to the offline state of the controlled device from the controlled device through the D2D connection. The method may comprise determining, by the electronic device, a recovery method corresponding to the error code based on designated recovery policy information. The method may comprise transmitting, by the electronic device, to the controlled device, a recovery command instructing to recover a connection between the controlled device and the server based on the determined recovery method.

In accordance with another aspect of the disclosure, one or more non-transitory computer-readable storage media storing one or more computer programs including computer-executable instructions that, when executed by one or more processors of an electronic device, cause the electronic device to perform operations are provided. The operations include obtaining, by the electronic device, first information indicating that a controlled device is in an offline state in which the controlled device is disconnected from a server, establishing, by the electronic device, a D2D connection with the controlled device, receiving, by the electronic device, an error code related to the offline state of the controlled device from the controlled device, determining, by the electronic device, a recovery method corresponding to the error code based on designated recovery policy information, and transmitting, by the electronic device, to the controlled device, a recovery command to instruct to recover a connection between the controlled device and the server based on the determined recovery method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP) (e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
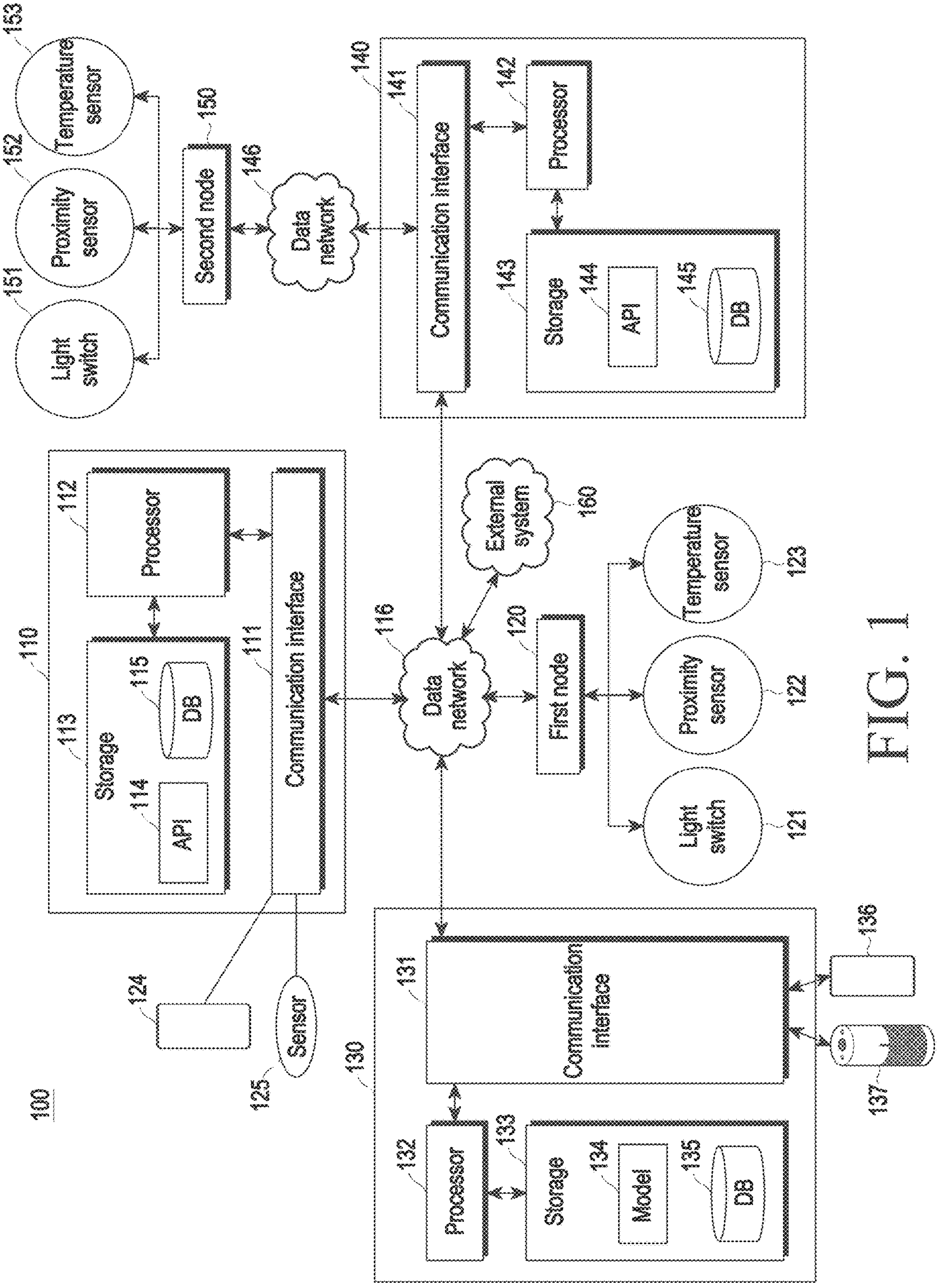
FIG. 1 illustrates an internet-of-things (IoT) system according to an embodiment of the disclosure.

FIG. 1 illustrates an internet-of-things (IoT) system 100 according to an embodiment of the disclosure. At least some of the components shown in FIG. 1 may be omitted, or at least one component not shown may be added.

Referring to FIG. 1, according to an embodiment, the IoT system 100 includes a plurality of electronic devices connectable to a data network 116 or 146. For example, the IoT system 100 may include at least one of a first IoT server 110, a first node 120, a voice assistance server 130, a second IoT server 140, a second node 150, or devices 121, 122, 123, 124, 125, 136, 137, 151, 152, and 153.

According to an embodiment, the first IoT server 110 may include at least one of a communication interface 111, a processor 112, or a storage unit 113. The second IoT server 140 may include at least one of a communication interface 141, a processor 142, or a storage unit 143. In the disclosure, the "IoT server" may remotely control and/or monitor one or more devices (e.g., the devices 121, 122, 123, 124, 125, 136, 137, 151, 152, and 153) directly without a relay device, or via a relay device (e.g., the first node 120 or the second node 150), based on, e.g., a data network (e.g., the data network 116 or data network 146). Here, "device" refers to, e.g., a sensor, home appliance, office electronic device, or processing device placed (or positioned) in a local environment, such as a home, office, factory, building, external place, or other types of sites, and is not limited to a specific type. A device that receives a control command and performs an operation corresponding to the control command may be referred to as a "target device." The IoT server may be referred to as a central server in light that it selects a target device from among a plurality of devices and provides control commands.

According to an embodiment, the first IoT server 110 may communicate with devices 121, 122, and 123 via the data network 116. The data network 116 may mean a network for remote communication, such as, e.g., the Internet or a computer network (e.g., a local area network (LAN) or wide area network (WAN)), or may encompass cellular networks.

According to an embodiment, the first IoT server 110 may connect to the data network 116 via the communication interface 111. The communication interface 111 may include a communication device (or communication module) for supporting communication of the data network 116 and may be implemented as a single integrated component (e.g., a single chip) or as a plurality of separate components (e.g., multiple chips). The first IoT server 110 may communicate with the devices 121, 122, and 123 via the first node 120. The first node 120 may receive data from the first IoT server 110 via the data network 116 and transmit the received data to at least some of the devices 121, 122, and 123. The first node 120 may receive data from at least some of the devices 121, 122, and 123 and transmit the received data to the first IoT server 110 via the data network 116. The first node 120 may function as a bridge between the data network 116 and the devices 121, 122, and 123. Although FIG. 1 illustrates only one first node 120, this is merely an example, and embodiments of the disclosure are not limited thereto.

In the disclosure, "node" may refer to an edge computing system or a hub device. According to an embodiment, the first node 120 may support wired and/or wireless communication of the data network 116 and may support wired and/or wireless communication with the devices 121, 122, and 123. For example, the first node 120 may connect to the devices 121, 122, and 123 via a short-range communication network, e.g., at least one of Bluetooth, Wi-Fi, Wi-Fi direct, Z-wave, Zig-bee, INSETEON, X10, or infrared data association (IrDA), but the type of communication is not limited to a specific one. The first node 120 may be placed (or positioned) in an environment, such as, e.g., a home, office, factory, building, external place, or other types of sites. Thus, the devices 121, 122, and 123 may be monitored and/or controlled by a service provided by the first IoT server 110, and the devices 121, 122, and 123 may not be required to have the capability of full network communication (e.g., Internet communication) for direct connection to the first IoT server 110. Although in the illustrated example, the devices 121, 122, and 123 are implemented as electronic devices in a home environment, such as, e.g., a lamp switch, proximity sensor, and temperature sensor, this is merely an example, and the devices 121, 122, and 123 are not limited thereto.

According to an embodiment, the first IoT server 110 may also support direct communication with devices 124 and 125. Here, "direct communication" may mean communication that does not rely on a relay device, such as the first node 120. For example, "direct communication" may mean communication via, e.g., a cellular communication network and/or data network.

According to an embodiment, the first IoT server 110 may transmit control commands to at least some of devices 121, 122, 123, 124, and 125. Here, "control command" may mean data to trigger a controllable device to perform a specific operation. The specific operation may be an operation performed by a device, including outputting, sensing, reporting, or managing (e.g., deleting or creating) information, but not limited thereto. For example, the processor 112 may obtain information (or a request) for creating a control command from an outside (e.g., at least some of the voice assistance server 130, second IoT server 140, external system 160, or devices 121, 122, 123, 124, and 125) and create a control command based on the obtained information. Alternatively, the processor 112 may create a control command based on a designated condition being met by a result of monitoring of at least some of the devices 121, 122, 123, 124, and 125. The processor 112 may control the communication interface 111 to transmit the control command to the target device.

According to an embodiment, the processor 112, processor 132, or processor 142 may be implemented as a combination of one or more of general-purpose processors, such as central processing units (CPUs), digital signal processors (DSPs), application processors, communication processors (CPs), graphics dedicated processors, such as graphics processing units (GPUs) or vision processing units (VPUs), or artificial intelligence dedicated processors, such as neural processing units (NPUs). The above-described processing units are merely examples. It will be easily appreciated by one of ordinary skill in the art that the processor 112 is not limited thereto as long as it is a computational means capable of executing instructions stored in the storage unit 113 and outputting the results of execution.

According to an embodiment, the processor 112 may configure a web-based interface based on the API 114 or may expose the resource managed by the first IoT server 110 to the outside. For example, the web-based interface may support communication between the first IoT server 110 and an external web service. For example, the processor 112 may allow the external system 160 to control and/or access the devices 121, 122, and 123. For example, the external system 160 may be an independent (or standalone) system that is not associated with the system 100 or is not part of the system 100. The external system 160 may be, e.g., an external server or website. However, access, by the external system 160, to the devices 121, 122, and 123 or the resource of the first IoT server 110 needs to be secured. According to an embodiment, for automated applications, the processor 112 may expose the API (114)-based API end point (e.g., universal resource locator (URL)) to the outside. As set forth above, the first IoT server 110 may transfer the control command to the target device among the devices 121, 122, and 123. The description of the communication interface 141, processor 142, the API 144 of the storage unit 143, and the database 145 of the second IoT server 140 may be substantially the same as the description of the communication interface 111, processor 112, the API 114 of the storage unit 113, and the database 115 of the first IoT server 110. The description of the second node 150 may be substantially the same as the description of the first node 120. The second IoT server 140 may transfer the control command to the target device among the devices 151, 152, and 153. The first IoT server 110 and the second IoT server 140 may be operated by the same service provider in an embodiment but, in another embodiment, the servers 110 and 140, respectively, may be operated by different service providers.

According to an embodiment, the voice assistance server 130 may transmit and receive data to/from the first IoT server 110 via the data network 116. According to an embodiment, the voice assistance server 130 may include at least one of the communication interface 131, processor 132, or storage unit 133. The communication interface 131 may communicate with a smartphone 136 or AI speaker 137 via a data network (not shown) and/or cellular network (not shown). The smartphone 136 or AI speaker 137 may include a microphone and may obtain a user voice, convert the user voice into a voice signal, and transmit the voice signal to the voice assistance server 130. The processor 132 may receive the voice signal from the smartphone 136 or AI speaker 137 via the communication interface 131. The processor 132 may process the received voice signal based on a stored model 134. The processor 132 may create (or identify) a control command using a processing result, based on information stored in the database 135. According to an embodiment, the storage unit 113, 133, or 143 may include, but is not limited to, at least one non-transitory type of storage medium of flash memory types, hard disk types, multimedia card micro types, card-type memories (e.g., secure digital (SD) or extreme digital (XD) memory cards), random access memories (RAMs), static random access memories (SRAMs), read-only memories (ROMs), electrically erasable programmable read-only memories (EEPROMs), programmable read-only memories (PROMs), magnetic memories, magnetic disks, or optical discs.

In various embodiments, at least one device (e.g., the device 124) communicating with the first IoT server 110 may be a smartphone (e.g., the electronic device 201 of FIG. 2) in a network environment.

Figure 2:
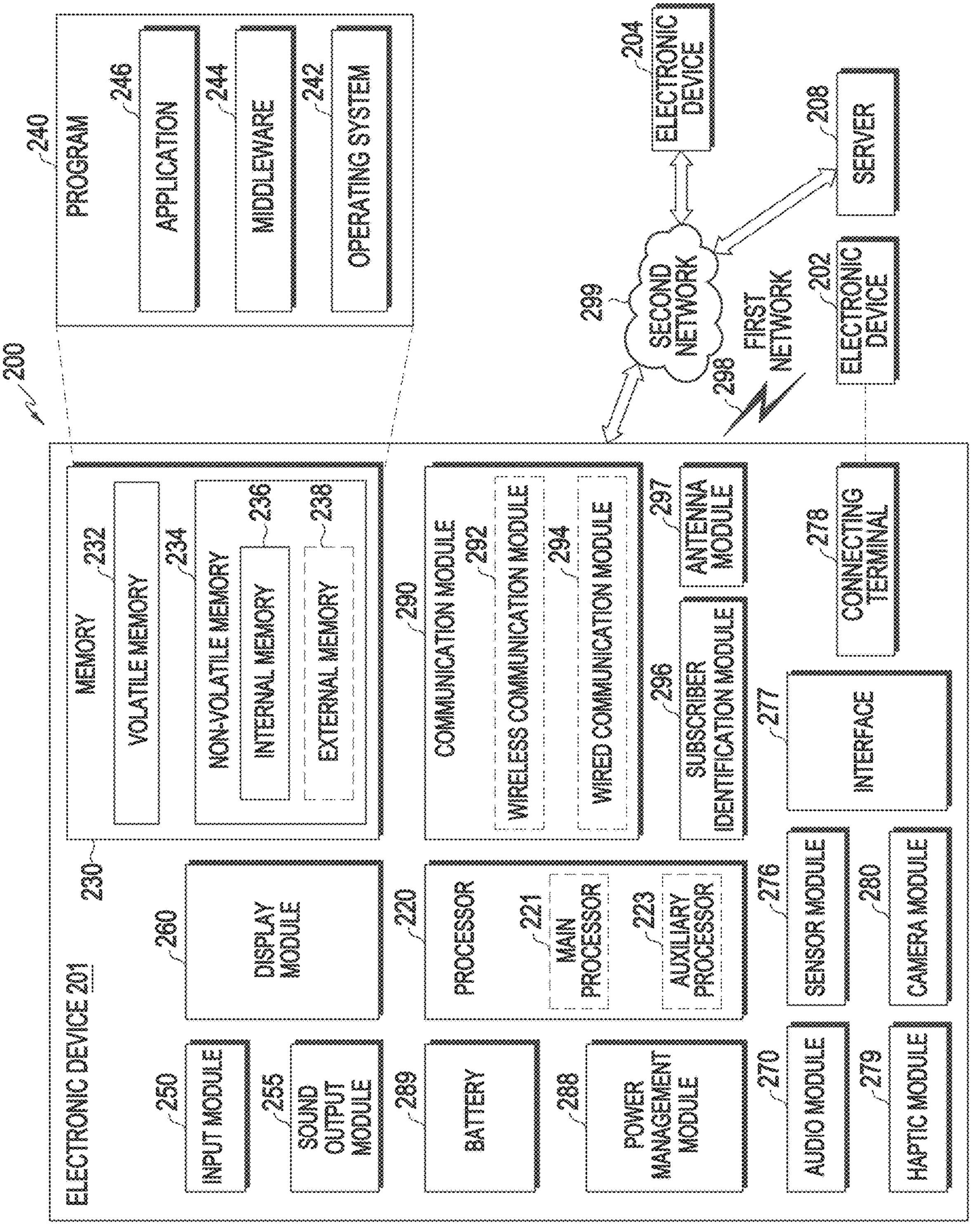
FIG. 2 is a view illustrating an electronic device in a network environment according to an embodiment of the disclosure.

FIG. 2 is a block diagram illustrating an electronic device 201 in a network environment 200 according to an embodiment of the disclosure.

Referring to FIG. 2, the electronic device 201 in the network environment 200 may communicate with at least one of an electronic device 202 via a first network 298 (e.g., a short-range wireless communication network), or an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input module 250, a sound output module 255, a display module 260, an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In an embodiment, at least one (e.g., the connecting terminal 278) of the components may be omitted from the electronic device 201, or one or more other components may be added in the electronic device 201. According to an embodiment, some (e.g., the sensor module 276, the camera module 280, or the antenna module 297) of the components may be integrated into a single component (e.g., the display module 260).

The processor 220 may execute, for example, software (e.g., a program 240) to control at least one other component (e.g., a hardware or software component) of the electronic device 201 coupled with the processor 220, and may perform various data processing or computation. According to an embodiment, as at least part of the data processing or computation, the processor 220 may store a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 221. For example, when the electronic device 201 includes the main processor 221 and the auxiliary processor 223, the auxiliary processor 223 may be configured to use lower power than the main processor 221 or to be specified for a designated function. The auxiliary processor 223 may be implemented as separate from, or as part of the main processor 221.

The auxiliary processor 223 may control at least some of functions or states related to at least one component (e.g., the display module 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223. According to an embodiment, the auxiliary processor 223 (e.g., the neural processing unit) may include a hardware structure specified for artificial intelligence model processing. The artificial intelligence model may be generated via machine learning. Such learning may be performed, e.g., by the electronic device 201 where the artificial intelligence is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input module 250 may receive a command or data to be used by another component (e.g., the processor 220) of the electronic device 201, from the outside (e.g., a user) of the electronic device 201. The input module 250 may include, for example, a microphone, a mouse, a keyboard, keys (e.g., buttons), or a digital pen (e.g., a stylus pen).

The sound output module 255 may output sound signals to the outside of the electronic device 201. The sound output module 255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 260 may visually provide information to the outside (e.g., a user) of the electronic device 201. The display module 260 may include, for example, a display, a hologram device, or a projector and control circuitry to control a corresponding one of the display, hologram device, and projector. According to an embodiment, the display module 260 may include a touch sensor configured to detect a touch, or a pressure sensor configured to measure the intensity of a force generated by the touch.

The audio module 270 may convert a sound into an electrical signal and vice versa. According to an embodiment, the audio module 270 may obtain the sound via the input module 250, or output the sound via the sound output module 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or motion) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to an embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device 204 via a first network 298 (e.g., a short-range communication network, such as Bluetooth™, wireless-fidelity (Wi-Fi) direct, or infrared data association (IrDA)) or a second network 299 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 292 may identify or authenticate the electronic device 201 in a communication network, such as the first network 298 or the second network 299, using subscriber information (e.g., international mobile subscriber identity (IMSI)) stored in the subscriber identification module 296.

The wireless communication module 292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the mmWave band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, an external electronic device (e.g., the electronic device 204), or a network system (e.g., the second network 299). According to an embodiment, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive signals or power to or from the outside (e.g., the external electronic device). According to an embodiment, the antenna module 297 may include one antenna including a radiator formed of a conductive body or conductive pattern formed on a substrate (e.g., a printed circuit board (PCB)). According to an embodiment, the antenna module 297 may include a plurality of antennas (e.g., an antenna array). In this case, at least one antenna appropriate for a communication scheme used in a communication network, such as the first network 298 or the second network 299, may be selected from the plurality of antennas by, e.g., the communication module 290. The signal or the power may then be transmitted or received between the communication module 290 and the external electronic device via the selected at least one antenna. According to an embodiment, other parts (e.g., radio frequency integrated circuit (RFIC)) than the radiator may be further formed as part of the antenna module 297.

According to various embodiments, the antenna module 297 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 201 and the external electronic device 204 via the server 208 coupled with the second network 299. The external electronic devices 202 or 204 each may be a device of the same or a different type from the electronic device 201. According to an embodiment, all or some of operations to be executed at the electronic device 201 may be executed at one or more of the external electronic devices 202 or 204, or the server 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra low-latency services using, e.g., distributed computing or mobile edge computing. In another embodiment, the external electronic device 204 may include an Internet-of-things (IoT) device. The server 208 may be an intelligent server using machine learning and/or a neural network. According to an embodiment, the external electronic device 204 or the server 208 may be included in the second network 299. The electronic device 201 may be applied to intelligent services (e.g., smart home, smart city, smart car, or health-care) based on 5G communication technology or IoT-related technology.

Figure 3:
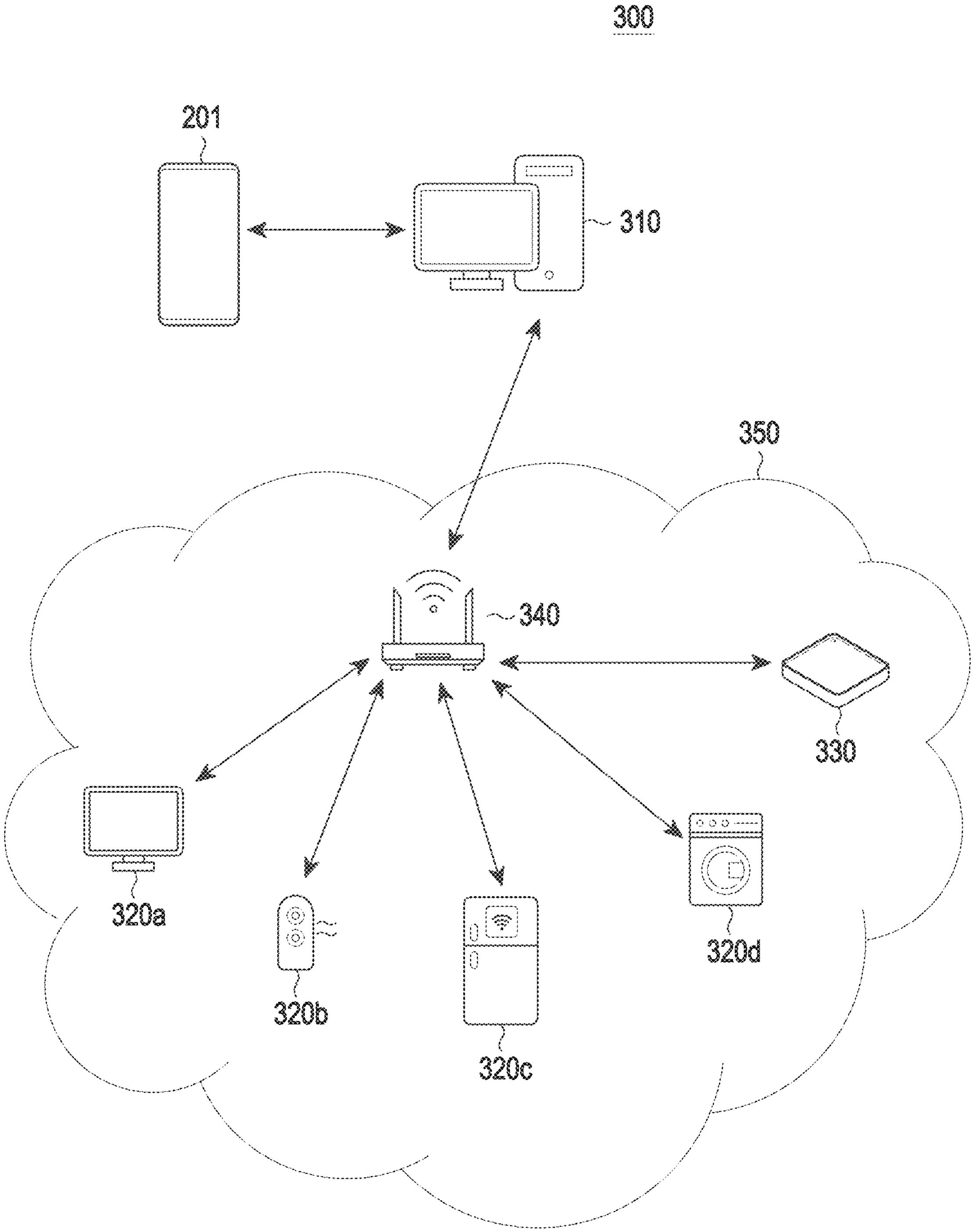
FIG. 3 is a view illustrating a network including controlled devices according to an embodiment of the disclosure.

FIG. 3 is a view illustrating a network including controlled devices according to an embodiment of the disclosure.

Referring to FIG. 3, a network 300 (e.g., an IoT network) may include a server 310 operating as an IoT cloud, an electronic device 201 capable of communicating with the server 310 through network communication (e.g., a wireless network), and one or more controlled devices 320*a*, 320*b*, 320*c*, and 320*d* in a local network 350 supporting IoT technology and capable of communicating with the server 310 through network communication (e.g., an access point (AP)) 340. In an embodiment, the local network 350 may include a hub device 330 (e.g., a smartphone, a tablet, a home automation panel, a PC, or a TV) configured to manage the connection and the state of the controlled devices 320*a*, 320*b*, 320*c*, and 320*d*. The electronic device 201 may communicate with the controlled devices 320*a*, 320*b*, 320*c*, and 320*d* and the hub device 330 via the server 310, through long-range wireless communication (e.g., the second network 299), or short-range wireless communication (e.g., the first network 298). The hub device 330 may communicate with the controlled devices 320*a*, 320*b*, 320*c*, and 320*d* through the AP 340 or through a direct-to-direct (D2D) connection.

The controlled devices 320*a*, 320*b*, 320*c*, and 320*d* may be controlled (e.g., report the state report and/or execute a specific function) by a remote command (e.g., a control command of the electronic device 201), and may include, e.g., at least one of a television, an air conditioner, a refrigerator, a washer, a lighting device, a security camera, a sensor, or a window treatment. The controlled devices 320*a*, 320*b*, 320*c*, and 320*d* may communicate with the electronic device 201 through the hub device 330, may communicate with the electronic device 201 through the server 310, and/or may communicate with the electronic device 201 directly (e.g., without passing through the server 310, the AP 340, or the hub device 330). In an embodiment, the controlled devices 320*a*, 320*b*, 320*c*, and 320*d* may be configured to communicate with the electronic device 201 through long-range wireless communication (e.g., the second network 299) or through short-range wireless communication (e.g., the first network 298). In an embodiment, the controlled devices 320*a*, 320*b*, 320*c*, and 320*d* may be configured to communicate with the server 310 through long-range wireless communication (e.g., the second network 299) or through short-range wireless communication (e.g., the first network 298).

In an embodiment, the electronic device 201 may be, e.g., a personal electronic device such as a smartphone, a tablet, or a wearable device, or may be an electronic device including a display and a user interface such as a television or a control console. The electronic device 201 may discover at least one (e.g., the controlled device 320*a*) of the controlled devices 320*a*, 320*b*, 320*c*, and 320*d*, and may perform a registration procedure for registering the discovered controlled device 320*a* in the server 310. The controlled devices 320*a*, 320*b*, 320*c*, and 320*d* may be registered in the server 310 to be associated with a user account. The electronic device 201 may monitor and control the controlled devices 320*a*, 320*b*, 320*c*, and 320*d* registered in the server 310 using the user account.

The electronic device 201 may identify the states of the controlled devices 320*a*, 320*b*, 320*c*, and 320*d* to be used by the user for an IoT control service, or may control the controlled devices 320*a*, 320*b*, 320*c*, and 320*d* (e.g., transmit a control command instructing to execute a specific function). The electronic device 201 may be an owner device of the local network 350. Although not illustrated, at least one member device including at least some functions and/or authority of the electronic device 201 may be included in the network 300. In an embodiment, although the member device does not perform the registration procedure for the controlled devices 320*a*, 320*b*, 320*c*, and 320*d*, the member device may perform a function of identifying or controlling the states of the controlled devices 320*a*, 320*b*, 320*c*, and 320*d* registered in the server 310.

The hub device 330 may be an electronic device that provides a hub function related to an IoT control service, and may be a server or gateway disposed in a physical area (e.g., a building, a home, or a hotel) corresponding to the local network 350, or a remote server disposed outside the local network 350. The hub device 330 may be a home appliance such as a smartphone, a tablet, a personal computer (PC), or a TV having a hub function. The hub device 330 may be registered in the server 310 by the electronic device 201 through a procedure similar to that of the controlled devices 320*a*, 320*b*, 320*c*, and 320*d*.

Figure 4:
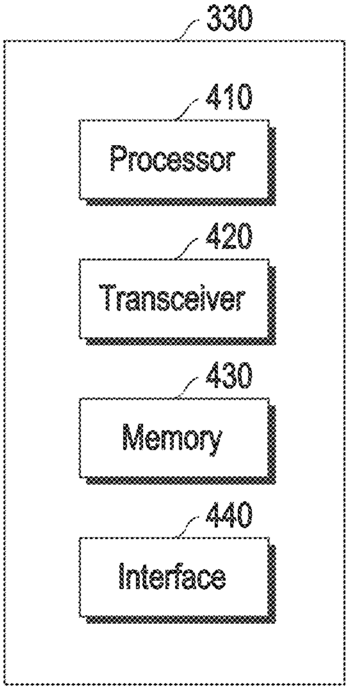
FIG. 4 is a block diagram illustrating a configuration of an electronic device providing an offline diagnosis function according to an embodiment of the disclosure.

FIG. 4 is a block diagram illustrating a configuration of an electronic device providing an offline diagnosis function according to an embodiment of the disclosure.

Referring to FIG. 4, an electronic device (e.g., a hub device 330) may be a device that implements an IoT service (e.g., an event-based IoT service) in a network 300 (e.g., an IoT network). For example, the IoT network may be a smart home network, and the IoT service may be an automation service. The electronic device (e.g., the hub device 330) may include a processor 410, a transceiver 420, a memory 430, and/or an interface 440.

The electronic device (e.g., the hub device 330) may include a transceiver 420 (e.g., the communication module 290 of FIG. 2) that transmits and receives signals to and from an external electronic device (e.g., at least one of the device 124 of FIG. 1, the electronic device 201 of FIG. 2, the server 310, the AP 340, or the controlled devices 320*a*, 320*b*, 320*c*, and 320*d*) using one or more antennas (not shown). In an embodiment, one or two or more antennas may be implemented as part of the antenna module 297 of FIG. 2. The electronic device (e.g., the hub device 330) may support at least one of long term evolution (LTE), 5G/NR (new radio), Zigbee, Z-wave, ultra-wideband (UWB), Wi-Fi, or Bluetooth (e.g., Bluetooth legacy (BT) and/or Bluetooth low energy (BLE)) through the transceiver 420. The transceiver 420 may include one or more communication circuits based on LTE, 5G/NR, Zigbee, Z-wave, UWB, Wi-Fi, BT, and/or BLE.

The electronic device (e.g., the hub device 330) may include an interface 440 (e.g., the interface 277 of FIG. 2), an input module 250, a display module 260, and/or an audio module 270) for communicating with components outside the network and/or the user.

The electronic device (e.g., the hub device 330) may include a processor 410 (e.g., the processor 220 of FIG. 2) that may be implemented as one or more single-core processors or one or more multi-core processors, and memory 430 (e.g., the memory 230 of FIG. 2) that stores instructions and data for the operation of the electronic device (e.g., the hub device 330).

The memory 430 may store applications, user information, device information, connection information, or related data for executing the IoT service.

The processor 410 may manage the states and operations of the controlled devices (e.g., the controlled devices 320*a*, 320*b*, 320*c*, and 320*d*) related to the IoT service, and may provide an offline diagnosis service of the controlled devices while the controlled devices are in an offline state (e.g., a server-offline state) in which they are disconnected from the server (e.g., the server 310). In an embodiment, the processor 410 may include a diagnosis module (e.g., the diagnosis module 832 or the diagnosis module 2110) that provides an offline diagnosis service.

Any one (e.g., the controlled device 320*b* or the hub device 330) of the controlled devices 320*a*, 320*b*, 320*c*, and 320*d* and the hub device 330 registered in the server 310 may be in an offline state (e.g., a server-offline state) in which they are disconnected from the server 310. The electronic device 201 may display, e.g., information indicating that the controlled device 320*b* or the hub device 330 is in the offline state, on the display module 260. The situation in which the controlled device 320*b* or the hub device 330 is displayed as offline on the electronic device 201 may occur due to one or more causes such as a device problem, an AP problem, a server failure, or an application problem.

Figure 5A:
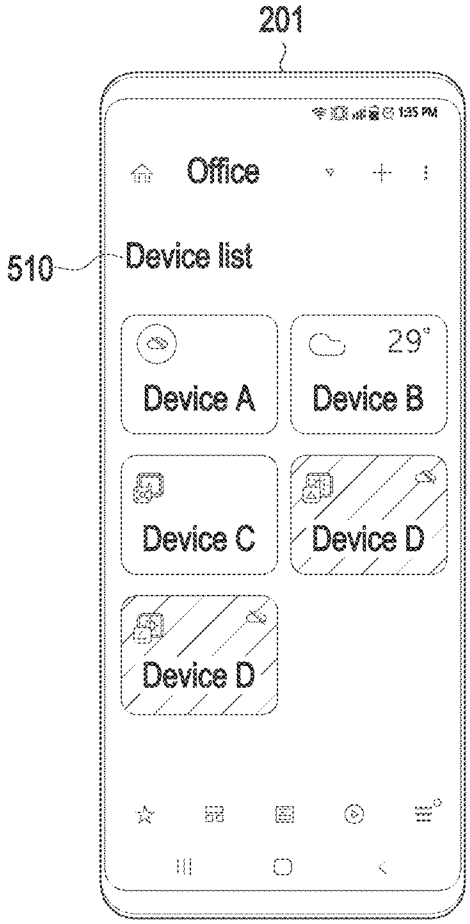
FIGS. 5A, 5B, and 5C are views illustrating an offline notification of an IoT network according to various embodiments of the disclosure.
Figure 5B:
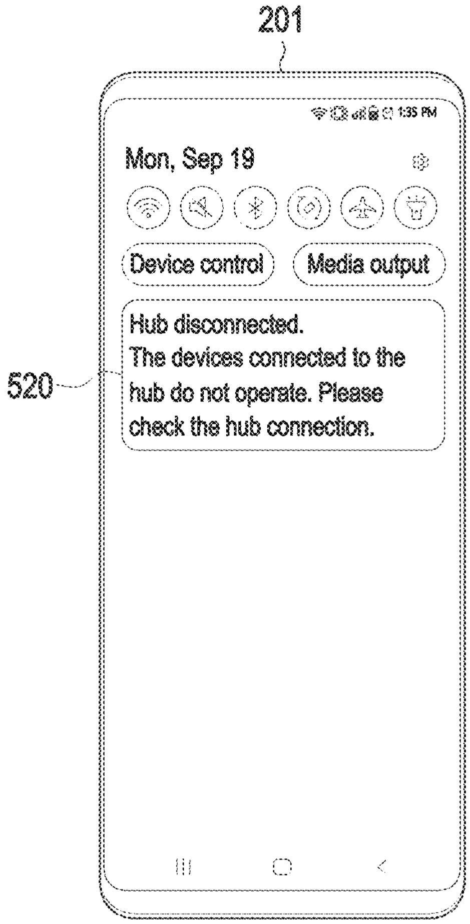
Figure 5C:
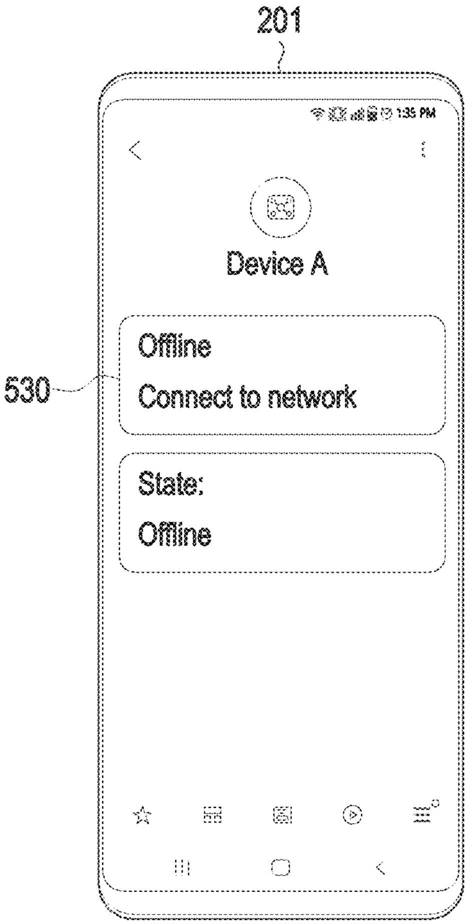

FIGS. 5A, 5B, and 5C are views illustrating an offline notification of an IoT network according to various embodiments of the disclosure.

Referring to FIG. 5A, the electronic device 201 may display a device list 510 of one or more devices (e.g., device A, device B, device C, device D, and device E) registered in the IoT network. The device list 510 may include information (e.g., text and/or image) indicating the connection state (e.g., online or offline) of each device. The user may view the device list 510 and recognize that a specific device (e.g., device D and device E) is in an offline state or an online state. In an embodiment, the offline state may include at least one of an offline state (e.g., a server-offline state) in which the device (e.g., the device D and the device E) is disconnected from the server (e.g., the server 310) or an offline state (e.g., a hub-offline state) in which the device (e.g., the device D and the device E) is disconnected from the electronic device 201.

Referring to FIG. 5B, based on receiving an input (e.g., touch) for selecting any one device (e.g., device D) in the offline state from the user, the electronic device 201 may display a guide (e.g., text) 520 indicating the connection state and a recovery method of device D. In an embodiment, device D may be a hub device (e.g., the hub device 330). For example, the guide 520 may indicate, e.g., "Hub disconnected. Devices connected to the hub do not operate. Please check the hub connection."

Referring to FIG. 5C, the electronic device 201 may display detailed information 530 including the offline state and the guide of device D based on a user input for selecting device D (e.g., the hub device 330) which is in the offline state. The electronic device 201 may execute an offline diagnosis service to analyze the cause of being offline and perform recovery by referring to a recovery guide.

For the offline diagnosis service that analyzes the cause of being offline and recovers (e.g., re-connection) the connection, the electronic device 201 may connect to an IoT device (e.g., the controlled devices 320*a*, 320*b*, 320*c*, and 320*d* or the hub device 330) that is in an offline state. In the offline diagnosis service, the electronic device 201 may provide a guide screen including a phrase guiding the user to switch the IoT device in the offline state to the soft-AP mode. After displaying the guide screen, the electronic device 201 may perform discovery to connect to the IoT device switched to the soft-AP mode through the guide screen. However, e.g., when an IoT device is installed at a location that is difficult for the user to reach or a method of manipulating the IoT device is complicated, it may be difficult or cumbersome for the user to switch the IoT device to the soft-AP mode.

Even after the user manipulates the IoT device to switch to the soft-AP mode, the D2D connection (e.g., soft-AP connection or BLE connection) between the electronic device 201 and the IoT device may fail. Further, when the server 310 identifies the IoT device as offline (e.g., a server-offline state) due to the disconnection of the session with the server 310 while the IoT device is connected to the network (e.g., the AP 340), the network connection may be unnecessarily disconnected for the D2D connection between the electronic device 201 and the IoT device.

Moreover, when the electronic device 201 is not in the same network (e.g., the local network 350) as the IoT device in the offline state or not in the home environment, the electronic device 201 may not perform detailed diagnosis on the IoT device in the offline state, and thus it may be difficult to recover the connection of the IoT device.

Figure 6:
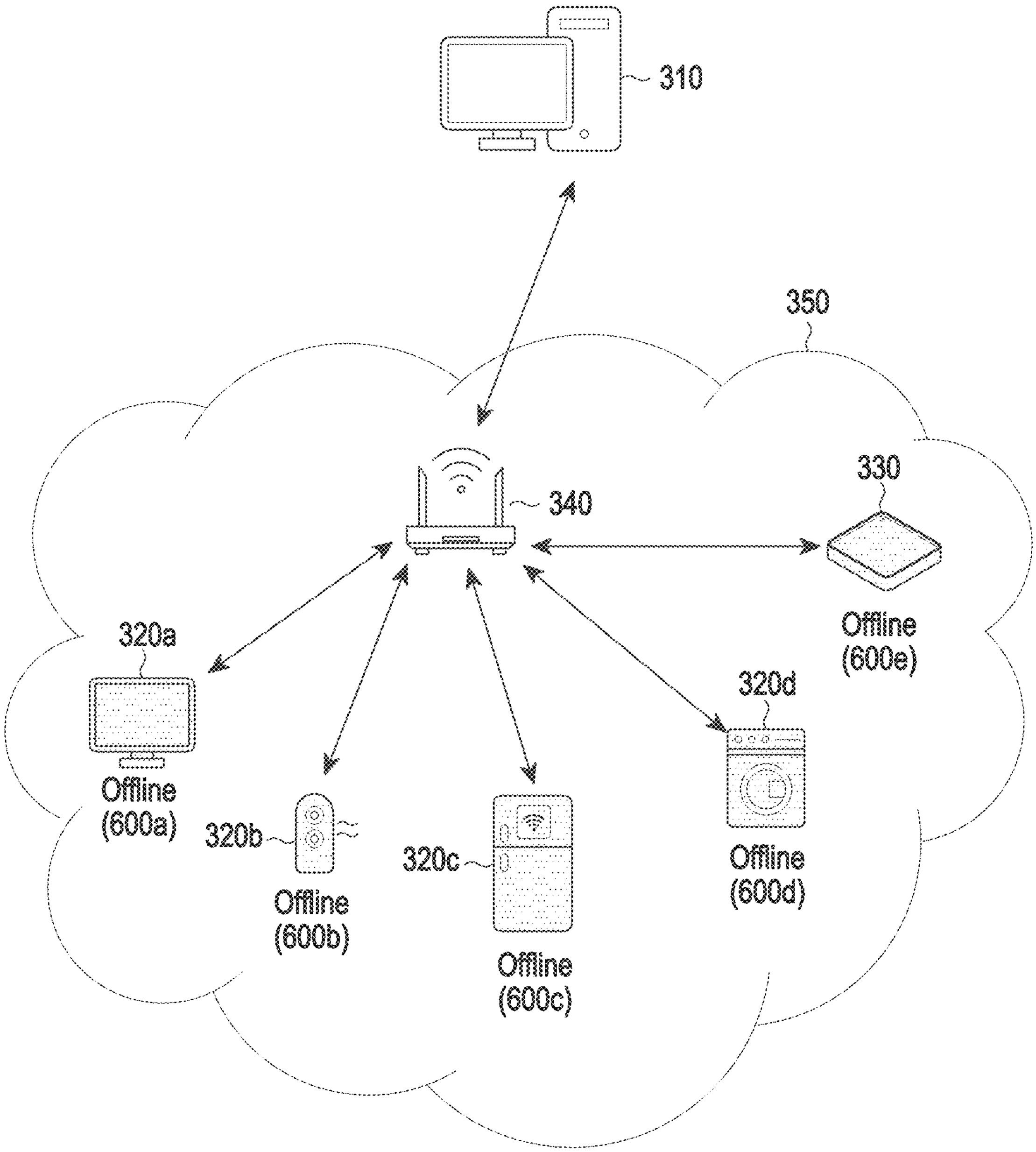
FIG. 6 is a view illustrating that a device is offline due to an access point (AP) problem according to an embodiment of the disclosure.

FIG. 6 is a view illustrating that a device is offline due to an AP problem according to an embodiment of the disclosure.

Referring to FIG. 6, IoT devices (e.g., the controlled devices 320*a*, 320*b*, 320*c*, and 320*d* and the hub device 330) connected to the AP 340 in the local network 350 may all be offline. This offline type may be caused by AP replacement, AP password change, AP failure, or server failure due to moving or carrier change. The electronic device 201 may identify the connection state (e.g., an online state or an offline state) of IoT devices, e.g., through the server 310, and may display information indicating the connection state (e.g., the offline state 600*a* of the controlled device 320*a*, the offline state 600*b* of the controlled device 320*b*, the offline state 600*c* of the controlled device 320*c*, the offline state 600*d* of the controlled device 320*d*, and the offline state 600*e* of the hub device 330) of the IoT devices.

Figure 7:
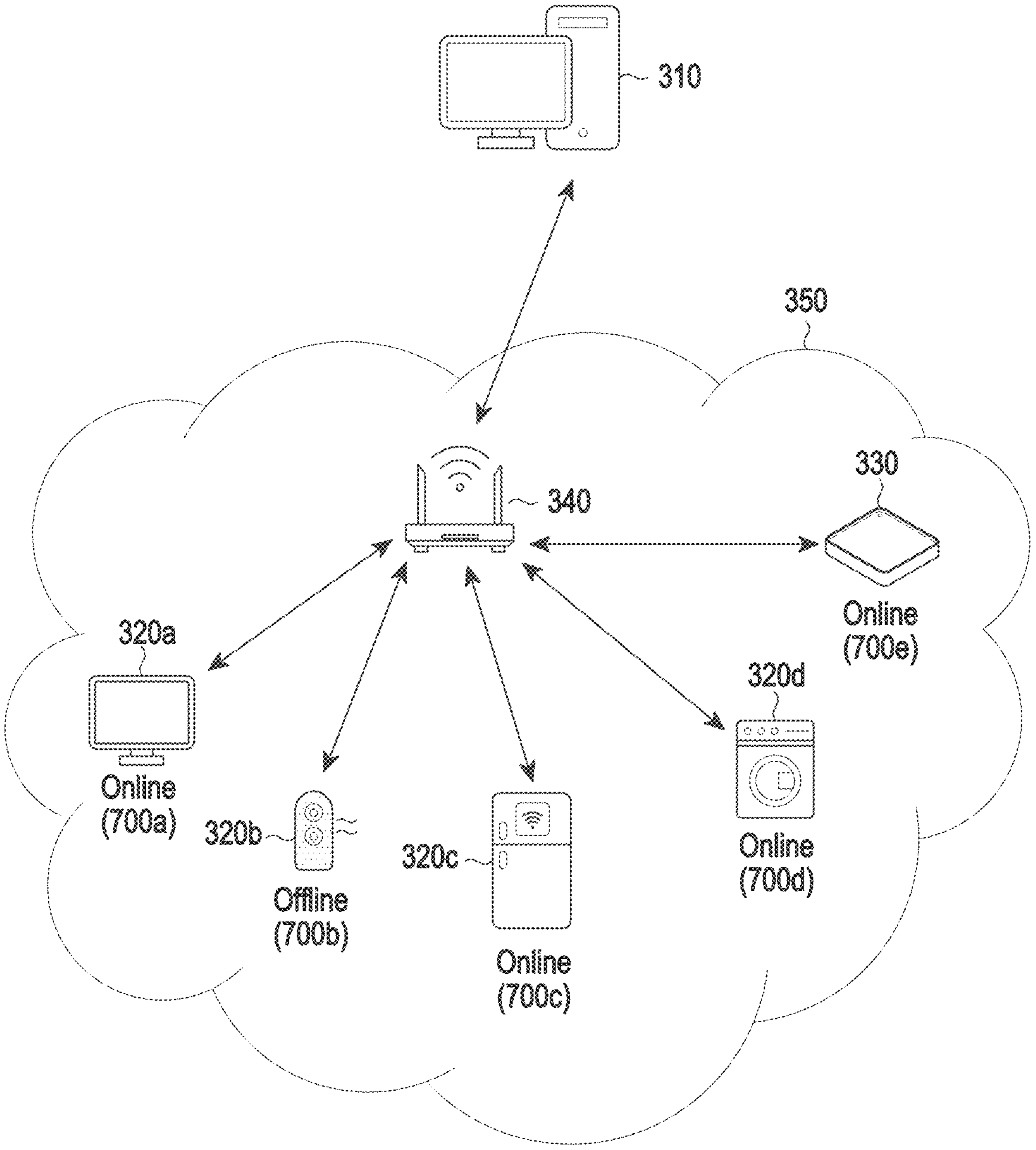
FIG. 7 is a view illustrating that a device is offline due to a device problem according to an embodiment of the disclosure.

FIG. 7 is a view illustrating that a device is offline due to a device problem according to an embodiment of the disclosure.

Referring to FIG. 7, at least one IoT device (e.g., the controlled device 320*b*) among IoT devices (e.g., the controlled devices 320*a*, 320*b*, 320*c*, and 320*d* and the hub device 330) connected to the AP 340 in the local network 350 may be offline.

This offline type may be caused by a session connection failure due to a communication failure between the IoT device (e.g., the controlled device 320*b*) and the server 310, or a network connection failure between the IoT device (e.g., the controlled device 320*b*) and the AP 340. As another example, as the server 310 intentionally releases the session (e.g., the session with the controlled device 320*b*) that is not used for a long time, the IoT device (e.g., the controlled device 320*b*) may turn offline. The electronic device 201 may identify the connection state (e.g., an online state or an offline state) of IoT devices, e.g., through the server 310, and may display information indicating the connection state (e.g., the online state 700*a* of the controlled device 320*a*, the offline state 700*b* of the controlled device 320*b*, the online state 700*c* of the controlled device 320*c*, the online state 700*d* of the controlled device 320*d*, and the online state 700*e* of the hub device 330) of the IoT devices.

The user may identify the cause of being offline and the offline type of the IoT device by executing the offline diagnosis service through the electronic device 201, and may recover the connection of the IoT device according to the identified offline type.

According to embodiments of the disclosure, instead of the user directly recognizing the offline state of the IoT device through the electronic device 201 and performing recovery through the offline diagnosis service, the electronic device (e.g., the hub device 330) positioned in the local network (e.g., the local network 350) may automatically detect the IoT device in the offline state and easily recover the connection of the IoT device without the user's additional operation.

Figure 8:
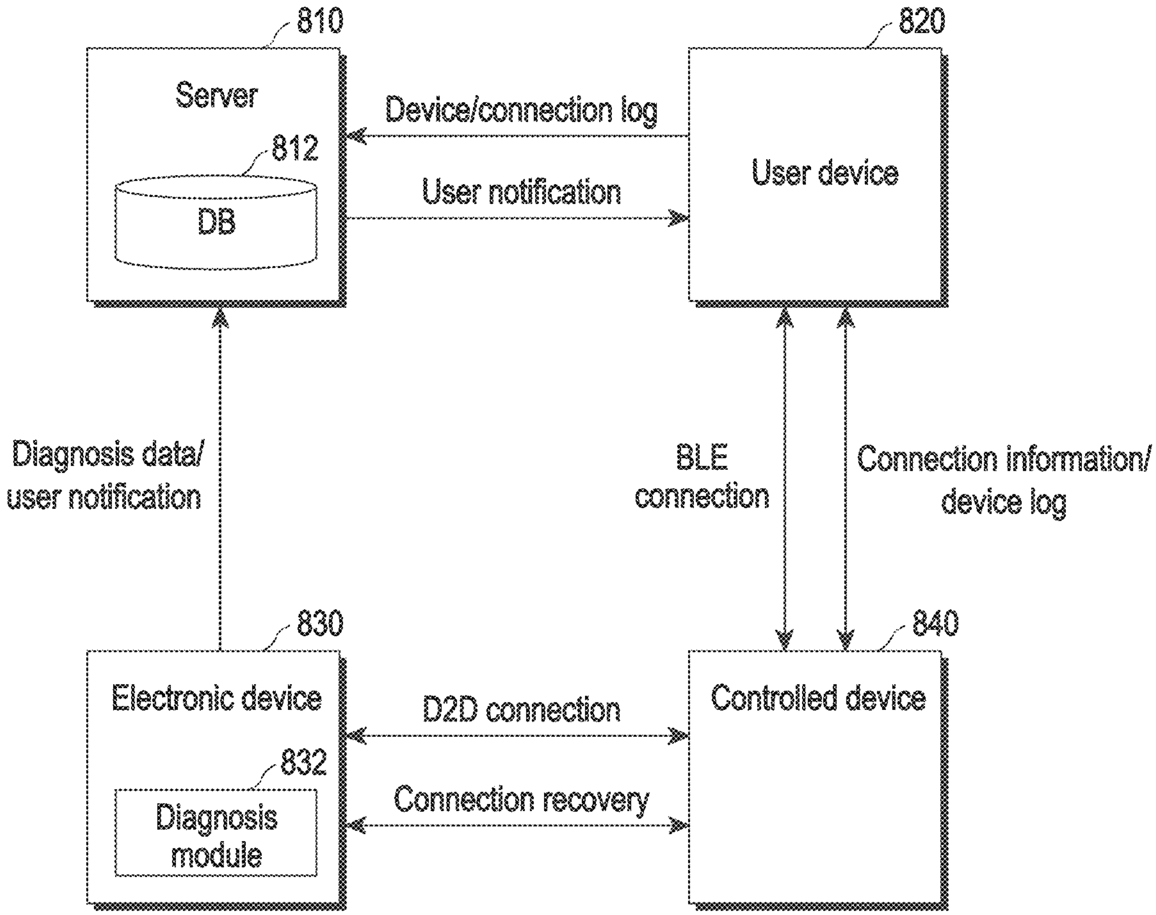
FIG. 8 illustrates a system architecture for supporting offline diagnosis and connection recovery according to an embodiment of the disclosure.

FIG. 8 illustrates a system architecture for supporting offline diagnosis and connection recovery according to an embodiment of the disclosure.

Referring to FIG. 8, a user device 820 (e.g., the electronic device 201) may include a client application capable of registering at least one controlled device 840 (e.g., the controlled devices 320*a*, 320*b*, 320*c*, and 320*d*) in a server 810 (e.g., the server 310) and remotely controlling the registered controlled device 840. As an example, the user device 820 including the client application may be any one of a mobile device, a TV, a family hub, or a smart watch. Onboarding may include registering the controlled device 840 in the server 810. The device 840 may be registered (e.g., onboarding) in the server 810 using any one of a hub connection, a cloud connection, or a cloud-to-cloud connection.

In the case of the hub connection, the controlled device 840 may be connected to the hub device (e.g., the hub device 330) using a short-range communication function such as Zigbee, Z-wave, or Wi-Fi, and may be registered in the server 310 through the hub device 330. In the case of the cloud connection, the controlled device 840 may be connected to the server 810 via an AP (not shown) (e.g., the AP 340). In the case of the cloud-cloud connection, the controlled device 840 may be first registered in a third-party cloud server (not shown), and registration information about the controlled device 840 may be transferred to the server 810 through an application programmable interface (API).

In the case of the cloud connection, the user device 820 may connect to the controlled device through the BLE connection, may transmit network connection information (e.g., Wi-Fi information or AP information related to the AP 340) for onboarding (e.g., registration in the server) to the controlled device 840 through the BLE connection, and may collect the device log of the controlled device 840 through the BLE connection. The user device 820 may upload a device log and/or a connection log related to the controlled device 840 to the server 810.

The electronic device 830 (e.g., the hub device 330) may include a diagnosis module 832 that executes an offline diagnosis service related to the controlled device 840. When the controlled device 840 is disconnected from the server 810 after onboarding, the electronic device 830 may execute an offline diagnosis service through the diagnosis module 832 to diagnose the cause of being offline and perform connection recovery. The electronic device 830 may upload diagnostic data generated as a result of the diagnosis to the server 810 (e.g., the database 812). In an embodiment, the diagnosis data may include an error code and a recovery result (e.g., success or failure).

The electronic device 830 may detect the offline state of the controlled device 840 and may support the controlled device 840 to automatically re-connect to the server 810 according to the recovery policy information. When the electronic device 830 is a hub device 330 equipped with a hub function, the electronic device 830 may register and control a hub-connected device.

The server 810 may receive diagnosis data generated as a result of diagnosing the offline state of the at least one controlled device 840 (e.g., the controlled devices 320*a*, 320*b*, 320*c*, and 320*d*) from the electronic device 830 and store the diagnosis data in a database (DB) 812.

Table 1 below shows an example of diagnosis data uploaded to the server 810 after executing an offline diagnosis service in the electronic device 830.

TABLE 1

| key | subfield | description | sample |
|---|---|---|---|
| sessionId | | ID of the currently ongoing diagnostic session | 54947df8-0e9e-4471-a2f9-9af509fb5889 |
| errorCode | | error code (analysis result) | "[\"NE11-1\"]" |
| failCode | | analysis or recovery failure | "AE01-1" |
| "deviceId" | | device's unique ID | "11111111-2222-3333-4444-abcdefgh1234" |
| "accountId" | | account ID | "aaaaaaaaaa" |
| "country" | | region | "KR" |
| "apConnected" | ssid | SSID of connected AP | "{"ssid":"dcon5G", "mn":"11:22:33", "frequency":"5412", "rssi":"−20", "capability":"WPA2"}" |
| | mn | model name of connected AP | |
| | frequency | frequency | |
| | rssi | received signal strength | |
| | capability | capability | |
| "deviceState" | | device state | "ONLINE" "OFFLINE" "UNKNOWN" |

TABLE 1-continued

| key | subfield | description | sample |
|---|---|---|---|
| "recoveryResult" | | recovery results | "SUCCESS""FAIL" "TIMEOUT" "LOCAL_SYNC_TIMEOUT" "CANCEL" "NO_ACTION" "NONE" |
| "reconnectingTime" | | Duration of reconnecting | 3405 |

The server 810 may manage recovery policy information indicating a recovery method and a troubleshooting guide for each error code related to one or more controlled devices (e.g., the controlled device 840), and may download recovery policy information indicating a recovery method for each error code to the electronic device 830. When the recovery method for each error code is changed, the server 810 may update the recovery policy information, and the electronic device 830 may download the updated recovery policy information from the server 810. The server 810 may collect the resultant diagnosis data of the offline diagnosis service and store the resultant diagnosis data in the database 812, and may update the recovery policy information to include whether to execute automatic recovery or whether to perform user notification according to the recovery success rate for each error code.

Table 2 below shows an example of recovery policy information including a recovery method and a troubleshooting guide for each error code.

TABLE 2

| error code | cause | recovery method | troubleshooting guide |
|---|---|---|---|
| DS01-1 | long term unused | user notification | disconnected from server due to long-term non-use |
| CE20 | sign-in fails | re-start | |
| CE90 | reset device | add again | |
| NE11-1 | router connection failure (AP not found) | Wi-Fi update | disconnected due to change in router information Please check the status of the router |
| NE11-4 | router connection failure (password mismatch) | Wi-Fi update | disconnected due to change in router information Please check the status of the router |
| NE11-2 | router connection failure (authentication) | user notification | disconnected due to router problem Please check the status of the router |

The electronic device 830 may download recovery policy information from the server 810. When the recovery policy is changed, the server 810 may update the recovery policy information according to the changed recovery policy, and the electronic device 830 may download the updated recovery policy information. The recovery policy information may be manually changed by the system manager or automatically updated according to the accumulated recovery success rate for each error code. For example, when a recovery success rate for a specific error code of the controlled device 840 is 70% or less, the recovery method for the error code may be changed to the user notification instead of automatic recovery.

Embodiments of the disclosure may be related to detecting the offline state of the controlled device 840, automatically recovering the controlled device 840 according to the cause of being offline, guiding a recovery situation to the user when automatic recovery is not possible, or diagnosing the offline state and recovering the connection by the electronic device 840 equipped with a hub function.

Figure 9:
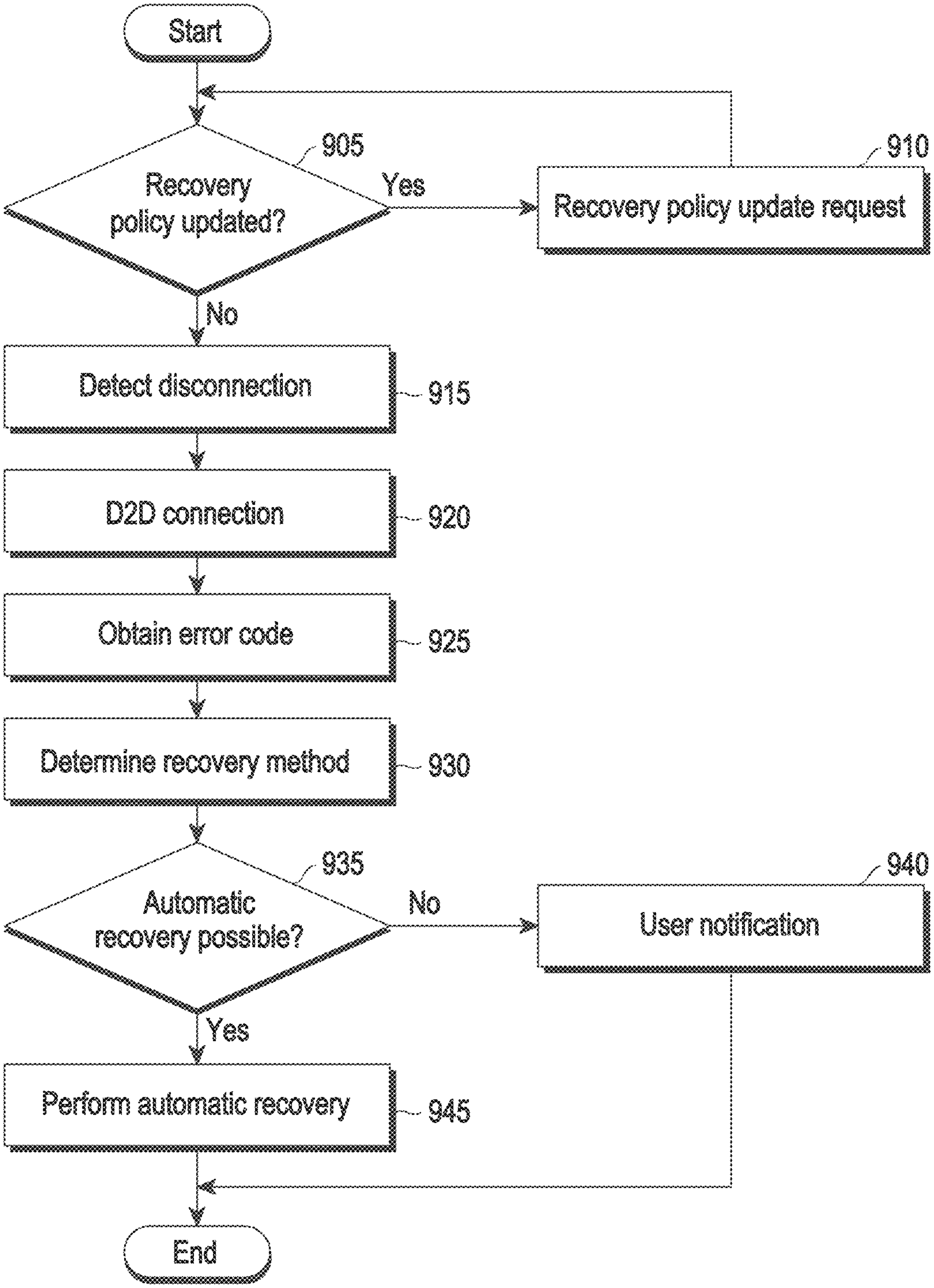
FIG. 9 is a flowchart illustrating an offline diagnosis and connection recovery procedure according to an embodiment of the disclosure.

FIG. 9 is a flowchart illustrating an offline diagnosis and connection recovery procedure according to an embodiment of the disclosure. At least one of the illustrated operations may be executed by a processor (e.g., the processor 410) of the electronic device 830 (e.g., the hub device 330). According to embodiments, at least one of operations to be described below may be omitted, modified, or ordered.

Referring to FIG. 9, in operation 905, the electronic device 830 (e.g., the processor 410) may determine whether a recovery policy for connection recovery of the controlled device 840 (e.g., the controlled devices 320*a*, 320*b*, 320*c*, and 320*d*) is updated. In an embodiment, the electronic device 830 (e.g., the processor 410) may previously store recovery policy information. In an embodiment, the electronic device 830 (e.g., the processor 410) may determine that the recovery policy is updated, based on receiving the update notification of the recovery policy from the server 810 (e.g., the server 310 or a policy server (not shown)), and may proceed to operation 910 to receive the updated recovery policy information. When the recovery policy is not updated, the electronic device 830 (e.g., the processor 410) may proceed to operation 915.

In operation 910, the electronic device 830 (e.g., the processor 410) may transmit a recovery policy update request from the server 810 (e.g., the server 310 or the policy server) and may receive the updated recovery policy information from the server 810. Operations 905 and 910 may be described in detail with reference to FIG. 10. In an embodiment, operations 905 and 910 may be omitted.

In operation 915, the electronic device 830 (e.g., the processor 410) may detect that the controlled device 840 (e.g., at least one of the controlled devices 320*a*, 320*b*, 320*c*, and 320*d*) is disconnected from the server 810 (i.e., the server-offline state). In an embodiment, the electronic device 830 (e.g., the processor 410) may discover the controlled device (e.g., the controlled device 840) offline by at least one of the following methods.

Figure 16:
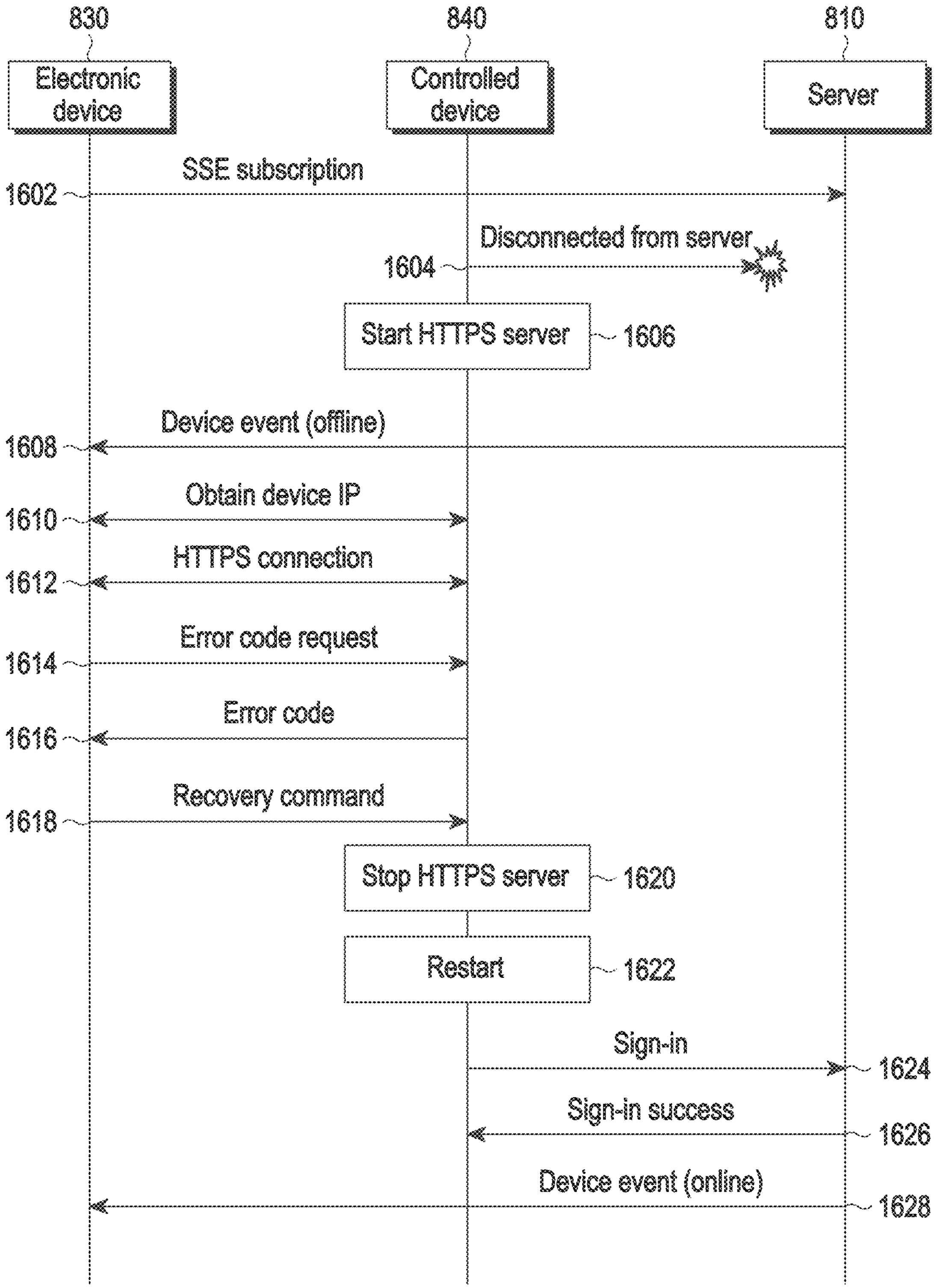
FIG. 16 is a sequence diagram illustrating offline detection and automatic recovery based on SSE according to an embodiment of the disclosure.
Figure 17:
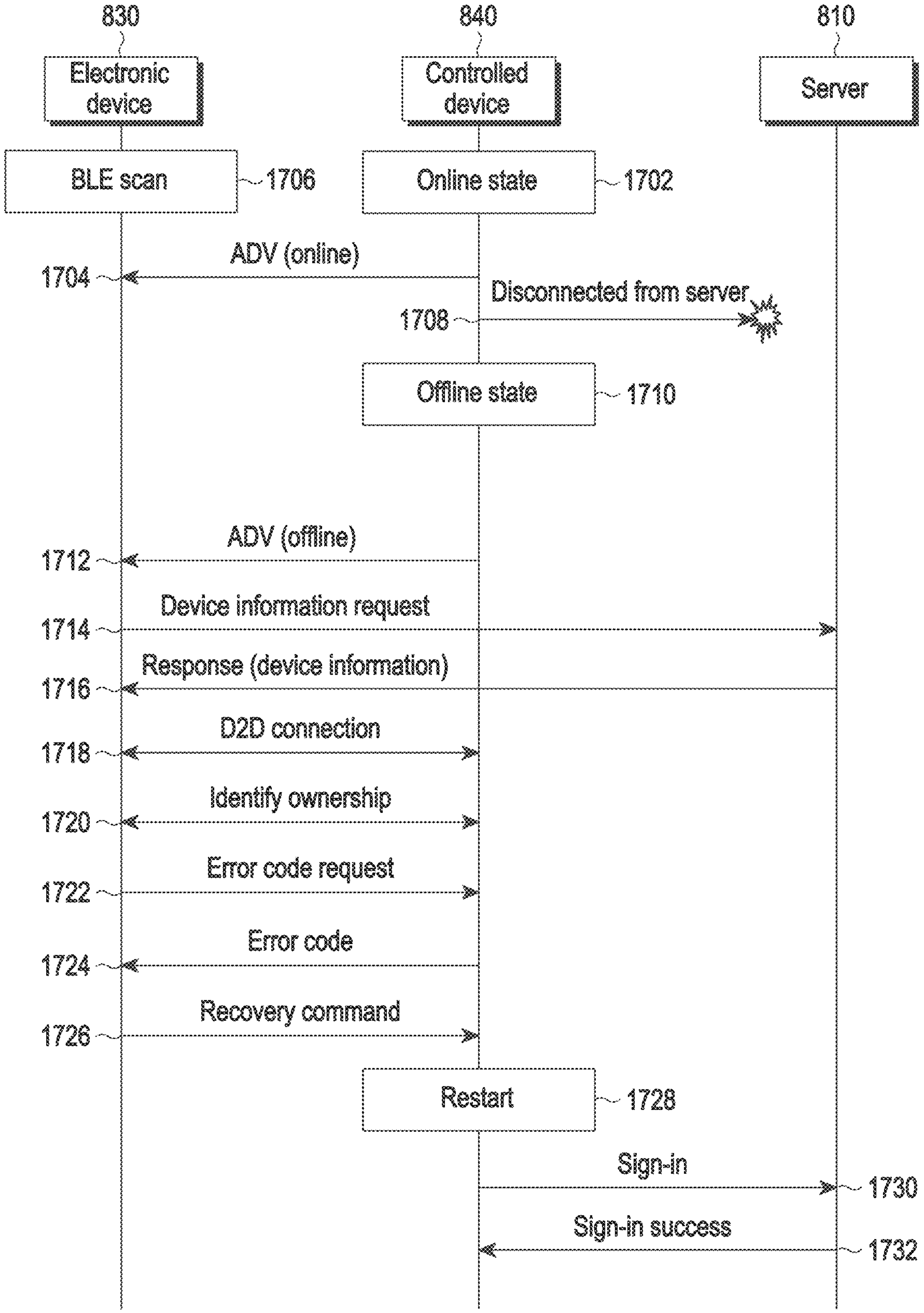
FIG. 17 is a sequence diagram illustrating offline detection and automatic recovery based on BLE scan according to an embodiment of the disclosure.

- Detection of disconnection through multicast domain name service (mDNS), DNS-based service discovery (DNS-SD), simple service discovery protocol (SSDP), or universal plug and play (UPNP) (e.g., operations 1404, 1406, 1408, and 1410 of FIG. 14);
- Detection of disconnection through server-send events (SSE) (e.g., operations 1604 and 1608 of FIG. 16); and/or
- Detection of disconnection through BLE scan (e.g., operations 1708, 1710, and 1712 of FIG. 17).

Operation 920, operation 925, operation 930, and operation 935 may refer to a procedure of determining an appropriate recovery method for an error code.

In operation 920, the electronic device 830 (e.g., the processor 410) may establish a D2D connection (e.g., at least one of a hypertext transfer protocol over secure (HTTPS) connection, a BLE connection, or a Wi-Fi connection based on a DNS search) with the controlled device 840 detected as the offline state.

In operation 925, the electronic device 830 (e.g., the processor 410) may obtain an error code of the controlled device 840. In an embodiment, the electronic device 830 (e.g., the processor 410) may receive an error code from the controlled device 840 through a DNS service discovery response, an HTTPS connection, or a BLE connection.

In operation 930, the electronic device 830 (e.g., the processor 410) may determine a recovery method corresponding to the error code, based on recovery policy information (e.g., Table 2). In an embodiment, the recovery policy information may indicate the recovery policy updated in operation 910.

In operation 935, the electronic device 830 (e.g., the processor 410) may determine whether automatic recovery is possible based on the determined recovery method. In an embodiment, the electronic device 830 (e.g., the processor 410) may determine whether the recovery method corresponding to the error code is the user notification. When the recovery method is the user notification, the electronic device 830 (e.g., the processor 410) may determine that automatic recovery is not possible and may proceed to operation 940. When the recovery method is not the user notification, the electronic device 830 (e.g., the processor 410) may determine that automatic recovery is possible and proceed to operation 945.

In operation 940, the electronic device 830 (e.g., the processor 410) may directly display the user notification related to the diagnosis result of the offline diagnosis service, or may request the user device 820 to display the user notification through the server 810.

In operation 945, the electronic device 830 (e.g., the processor 410) may perform the recovery method corresponding to the error code. In an embodiment, the recovery method may include any one of updating to the changed AP information, performing automatic onboarding, or performing automatic re-connection. Although not illustrated, the electronic device 830 (e.g., the processor 410) may determine whether the controlled device 840 is successfully connected to the server 810 as a result of performing the recovery method, and may report diagnosis data including the error code and the recovery result (e.g., success or failure) to the server 810.

In an embodiment, when the electronic device 830 is the hub device 330, the electronic device 830 may perform connection recovery to maintain connectivity.

Figure 10:
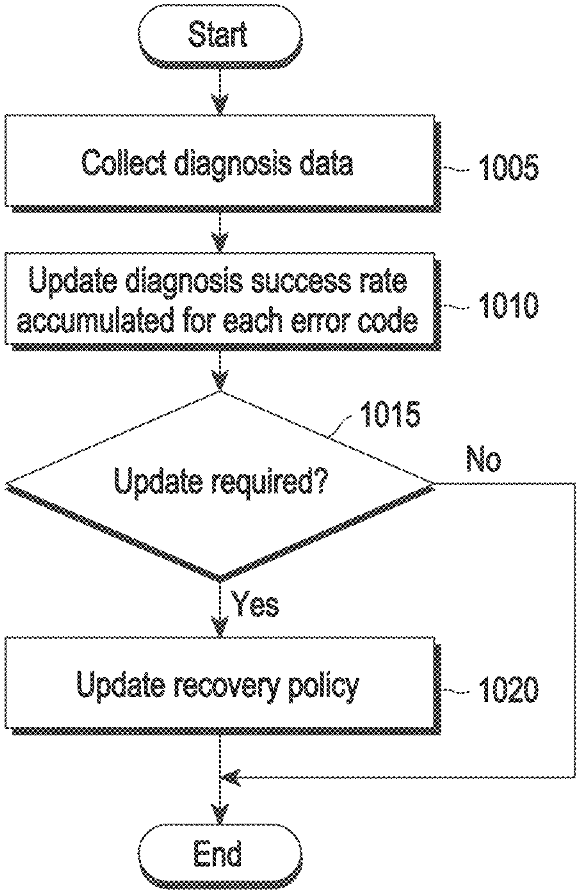
FIG. 10 is a flowchart illustrating a procedure for updating a recovery policy according to an embodiment of the disclosure.

FIG. 10 is a flowchart illustrating a procedure for updating a recovery policy according to an embodiment of the disclosure. At least one of the illustrated operations may be executed by a processor (not illustrated) of the server 810 (e.g., the server 310). According to embodiments, at least one of operations to be described below may be omitted, modified, or ordered.

Referring to FIG. 10, in operation 1005, the server 810 may receive diagnosis data (e.g., diagnosis data in Table 1) generated as a result of the offline diagnosis service from the electronic device 830. In an embodiment, the diagnosis data may include an error code and a recovery result (e.g., success or failure) related to the controlled device 840 detected as offline.

In operation 1010, the server 810 may accumulate the success rate for the error code. In an embodiment, the success rate may indicate a probability that the connection to the server 810 succeeds as a result of performing the automatic recovery of the controlled device 840.

In operation 1015, the server 810 may determine whether it is necessary to update the recovery policy information corresponding to the error code. In an embodiment, when the accumulated success rate exceeds a reference value and the recovery method corresponding to the error code is the user notification, the server 810 may determine to update the recovery policy information corresponding to the error code. When it is necessary to update the recovery policy information, the server 810 may proceed to operation 1020. When it is not necessary to update the recovery policy information, the server 810 may terminate the procedure.

In operation 1020, the server 810 may update the recovery policy information (e.g., Table 2) corresponding to the error code. In an embodiment, the server 810 may set the recovery method corresponding to the error code in the recovery policy information to automatic recovery.

Figure 11:
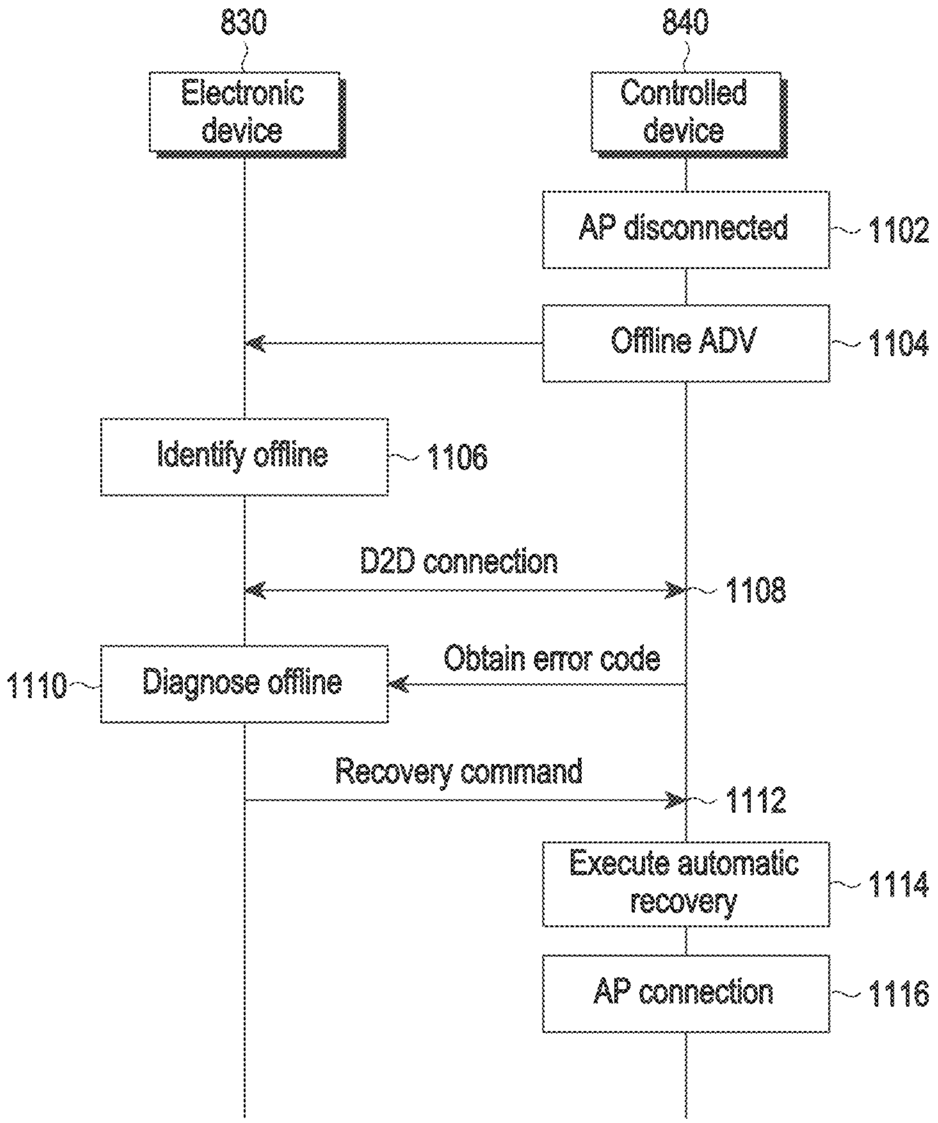
FIG. 11 is a sequence diagram illustrating automatic recovery of an offline device through Bluetooth low energy (BLE) scan according to an embodiment of the disclosure.

FIG. 11 is a sequence diagram illustrating automatic recovery of an offline device through BLE scan according to an embodiment of the disclosure.

Referring to FIG. 11, in operation 1102, the controlled device 830 may be disconnected from an AP (e.g., the AP 340). In operation 1104, the controlled device 830 may start broadcasting an offline advertising packet (ADV) based on detecting that the connection with the AP 340 is disconnected and becomes an offline state (e.g., a server-offline state in which the connection between the controlled device 830 and the server 810 is disconnected). In an embodiment, the offline ADV may include information (e.g., an online bit set to 0x00) indicating that the controlled device 830 is in the offline state.

In operation 1106, the electronic device 830 may identify the offline state of the controlled device 840 based on receiving the offline ADV through BLE scan. In operation 1108, the electronic device 830 may establish a D2D connection (e.g., a BLE connection or a Bluetooth generic attribute profile (GATT) connection) with the controlled device 840. In operation 1110, the electronic device 830 may perform an offline diagnosis service on the controlled device 840 through the D2D connection. In an embodiment, the electronic device 830 may receive an error code indicating the cause of the controlled device 840 being offline through the D2D connection, and may determine a recovery method (e.g., changing AP information, rebooting, or restarting) corresponding to the error code. In an embodiment, the recovery method may be determined based on pre-stored recovery policy information (e.g., Table 2).

In operation 1112, the electronic device 830 may transmit a recovery command indicating the recovery method according to the result of performing the offline diagnosis service to the controlled device 840. In operation 1114, the controlled device 840 may perform automatic recovery (e.g., changing AP information, rebooting or restarting the controlled device 840) based on the recovery command of the electronic device 830. In operation 1116, the controlled device 840 may be connected to an AP (e.g., the AP 340 or a new AP (not shown)) by performing the automatic recovery. The controlled device 840 may be re-connected to the server 810 through the AP 340 or a new AP.

Figure 12:
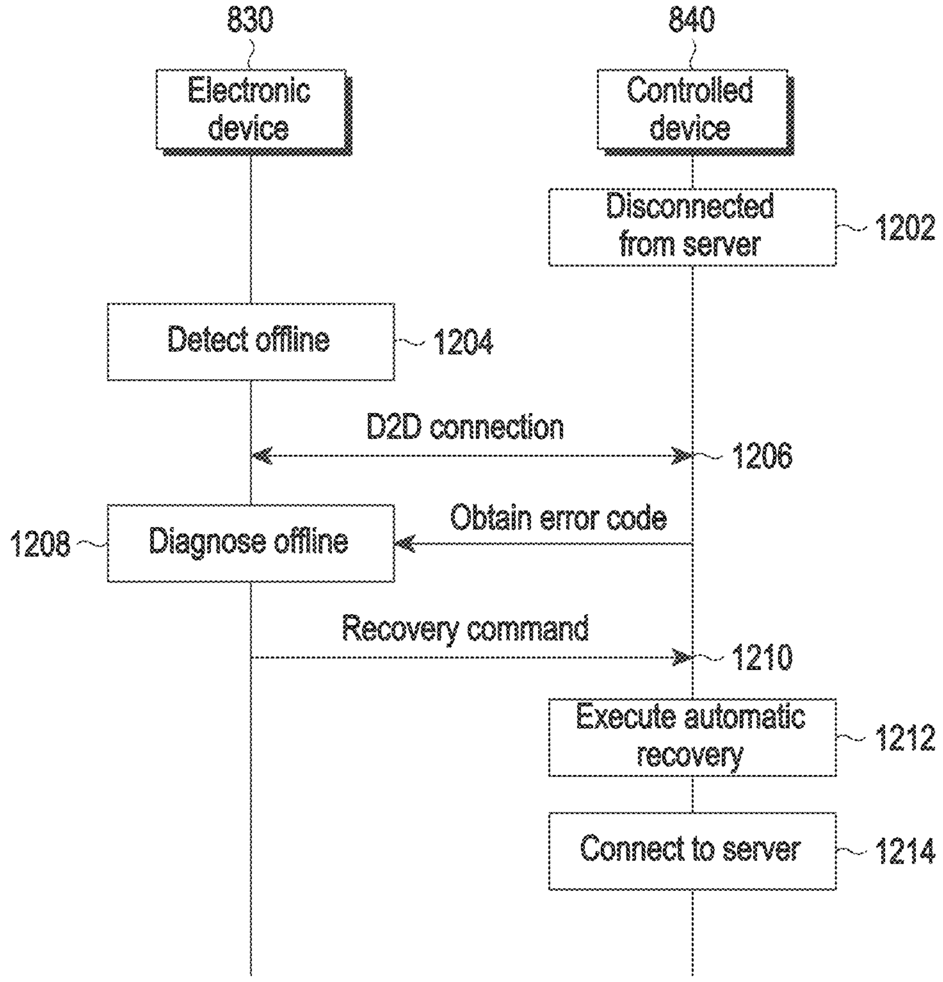
FIG. 12 is a sequence diagram illustrating an automatic recovery procedure of an offline device through a local network device search according to an embodiment of the disclosure.

FIG. 12 is a sequence diagram illustrating an automatic recovery procedure of an offline device through a local network device search according to an embodiment of the disclosure.

Referring to FIG. 12, in operation 1202, the controlled device 830 may identify that the connection (e.g., session) with the server 810 is disconnected. In operation 1204, the electronic device 830 may detect the offline state of the controlled device 830 (e.g., the server-offline state in which the connection between the controlled device 830 and the server 810 is disconnected) through the local network search. In an embodiment, the local network search may include offline detection using at least one of mDNS, DNS-SD, SSDP, UPNP, or SSE.

In operation 1206, the electronic device 830 may establish a D2D connection (e.g., HTTPS connection) with the controlled device 840. In operation 1208, the electronic device 830 may perform an offline diagnosis service on the controlled device 840 through the D2D connection. In an embodiment, the electronic device 830 may receive an error code indicating the cause of the controlled device 840 being offline through the D2D connection, and may determine a recovery method (e.g., changing AP information, rebooting, or restarting) corresponding to the error code. In an embodiment, the recovery method may be determined based on pre-stored recovery policy information (e.g., Table 2).

In operation 1210, the electronic device 830 may transmit a recovery command indicating the recovery method according to the result of performing the offline diagnosis service to the controlled device 840. In operation 1212, the controlled device 840 may perform automatic recovery (e.g., changing AP information, rebooting or restarting the controlled device 840) based on the recovery command of the electronic device 830. In operation 1214, the controlled device 840 may be connected to an AP (e.g., the AP 340 or a new AP (not shown)) by performing the automatic recovery. The controlled device 840 may be re-connected to the server 810 through the AP 340 or a new AP.

Figure 13:
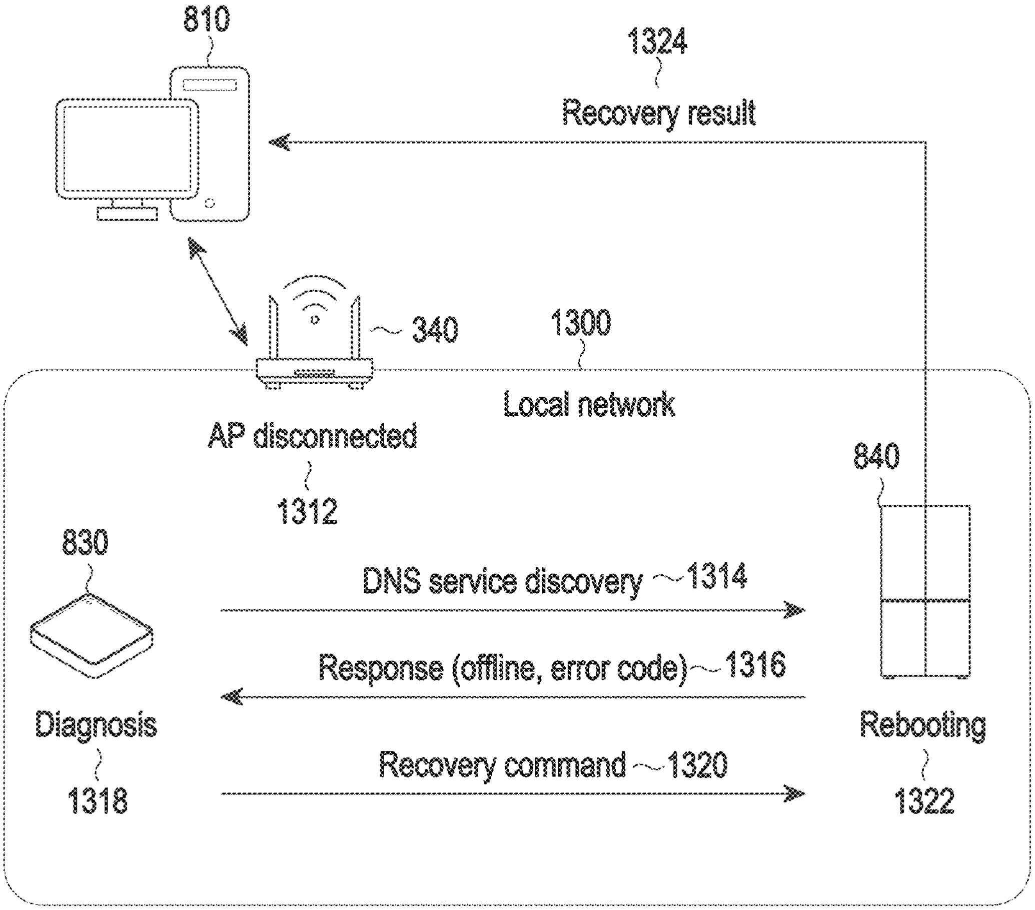
FIG. 13 is a view illustrating offline detection and automatic recovery based on multicast domain name service (mDNS)/DNS-based service discovery (DNS-SD) according to an embodiment of the disclosure.

FIG. 13 is a view illustrating offline detection and automatic recovery based on mDNS/DNS-SD according to an embodiment of the disclosure.

Referring to FIG. 13, the electronic device 830 (e.g., the hub device 330) and the controlled device 840 (e.g., the controlled devices 320*a*, 320*b*, 320*c*, and 320*d*) in the local network 1300 (e.g., the local network 350) may be connected to the server 810 through the AP 340. In operation 1312, the controlled device 840 may detect disconnection from the AP 340. In an embodiment, the controlled device 840 may be disconnected from the AP 340 due to a software problem of the controlled device 840.

In operation 1314, the electronic device 830 may periodically (e.g., every N minutes) transmit DNS service discovery. The electronic device 830 may periodically transmit DNS service discovery based on mDNS or DNS-SD to monitor the controlled device 840 being offline. In operation 1316, the controlled device 840 may transmit a response (e.g., a DNS service discovery response corresponding to the DNS service discovery) including offline state information and an error code to the electronic device 830 based on detecting that the connection with the AP 340 is disconnected. In an embodiment, the DNS service discovery may be based on mDNS or DNS-SD. mDNS or DNS-SD may be used to find the hostname without setting zero in the local area network. DNS-SD may be used to set the service type using the pointer record (PTR) of DNS.

In operation 1318, the electronic device 830 may determine a recovery method corresponding to the error code by executing an offline diagnosis service based on the error code. In operation 1320, the electronic device 830 may transmit a recovery command indicating the recovery method to the controlled device 840. In an embodiment, the electronic device 830 may establish a D2D connection (e.g., HTTPS connection) with the controlled device 840 to transmit the recovery command. In operation 1322, the controlled device 840 may perform automatic recovery (e.g., rebooting or restarting) according to the recovery method based on the recovery command. In operation 1324, the controlled device 840 may be connected to the AP 340 through the automatic recovery, and may report a recovery result (e.g., connection recovery complete or online state) to the server 810 through the AP 340.

Figure 14:
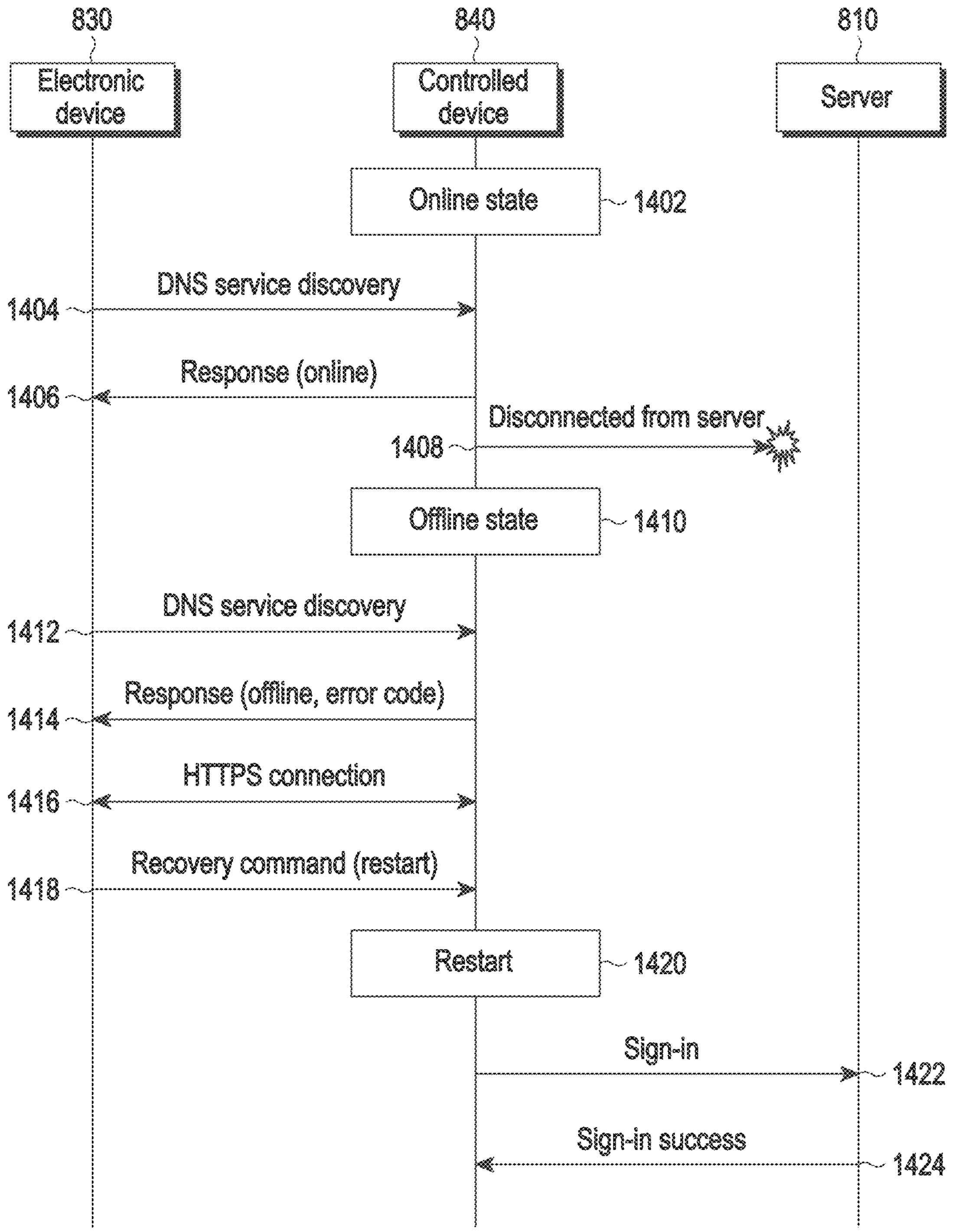
FIG. 14 is a sequence diagram illustrating offline detection and automatic recovery based on mDNS/DNS-SD according to an embodiment of the disclosure.

FIG. 14 is a sequence diagram illustrating offline detection and automatic recovery based on mDNS/DNS-SD according to an embodiment of the disclosure.

Referring to FIG. 14, in operation 1402, the controlled device 840 may be in an online state connected to the server 810 through the AP 340 (not shown). In operation 1404, the electronic device 830 may periodically (e.g., every N minutes) transmit DNS service discovery. The service type of the DNS service discovery may be designated as a value, e.g., [_calmrecovery._tcp.local], designated to detect whether the controlled device 840 is offline. In operation 1406, the controlled device 840 may transmit, to the electronic device 830, a response (e.g., a DNS service discovery response) including information indicating that the controlled device 840 is in an online state after onboarding on the server 810. In an embodiment, the hostname in the response may be determined as a value capable of securing uniqueness, such as [last 5 digits of the device ID+_calmrecovery.local], in order to avoid duplication in the local network 1300 (e.g., the local network 350).

In an embodiment, the response may be configured as shown in Table 3 below.

TABLE 3

| |
|---|
| hostname = [9f4d3-calmrecovery.local] |
| address = [aaa.bbb.cc.d] |
| port = [1234] |
| txt = ["Online-true, LastErrorCode=UE01", identifier=54f8d62...] |

In operation 1408, the connection (e.g., session) between the controlled device 840 and the server 810 may be disconnected, and in operation 1410, the controlled device 840 may detect that the controlled device 840 is in the offline state (e.g., a server-offline state in which the connection between the controlled device 840 and the server 810 is disconnected). In operation 1412, the electronic device 830 may transmit a DNS service discovery including a service type of [_calmrecovery._tcp.local] according to a designated period. In operation 1414, the controlled device 840 may transmit, to the electronic device 830, a response (e.g., a DNS service discovery response) including information indicating that the device is in the offline state and an error code, based on detecting that the device is in the offline state. In an embodiment, the response may be configured as shown in Table 4 below.

TABLE 4

| |
|---|
| hostname = [9f4d3-calmrecovery.local] |
| address = [aaa.bbb.cc.d] |
| port = [1234] |
| txt = ["Online=false, LastErrorCode=CE20", identifier-54f8d62...] |

Here, the txt field may include information (e.g., "Online=false") indicating that the controlled device 840 is in the offline state and an error code (e.g., "LastErrorCode=CE20").

The electronic device 830 may identify that the controlled device 840 is the user's own device based on the response (e.g., information included in the identifier field of the response). In an embodiment, the controlled device 840 may include the serial number of the controlled device 840 in the identifier field, and the electronic device 830 may identify the serial number. The electronic device 830 may determine a recovery method for the controlled device 840 based on the error code in the response. In an embodiment, the recovery method may be determined based on pre-stored recovery policy information (e.g., Table 2).

In operation 1416, the electronic device 830 may establish a D2D connection (e.g., HTTPS connection) with the controlled device 840. In an embodiment, the electronic device 830 may transmit an HTTPS connection request to the controlled device 840 based on the device IP address and port number included in the response. The electronic device 830 may generate a transport layer security (TLS) session with the controlled device 840 based on the certificate. In operation 1418, the electronic device 830 may transmit a recovery command to the controlled device 840 through the HTTPS connection. The recovery command may include information (e.g., {"command": "restartThings"}) indicating the recovery method (e.g., restarting) determined based on the error code.

In operation 1420, the controlled device 840 may execute the recovery method (e.g., restarting) based on the recovery command. After restarting, the controlled device 840 may be re-connected to the AP 340 based on pre-stored AP information (e.g., service set ID (SSID), password, authentication type, and/or encryption type). In operation 1422, the controlled device 840 may transmit a sign-in request to the server 810 through the AP 340. In operation 1424, the server 810 may respond to the controlled device 840 with the sign-in success.

Although not illustrated, in an embodiment, the electronic device 830 may receive, from the server 810, information indicating that the controlled device 840 is in the online state. Although not illustrated, in an embodiment, the electronic device 830 may transmit diagnosis data (e.g., diagnosis data in Table 1) related to the diagnosis and recovery results of the controlled device 840 to the server 810.

Figure 15:
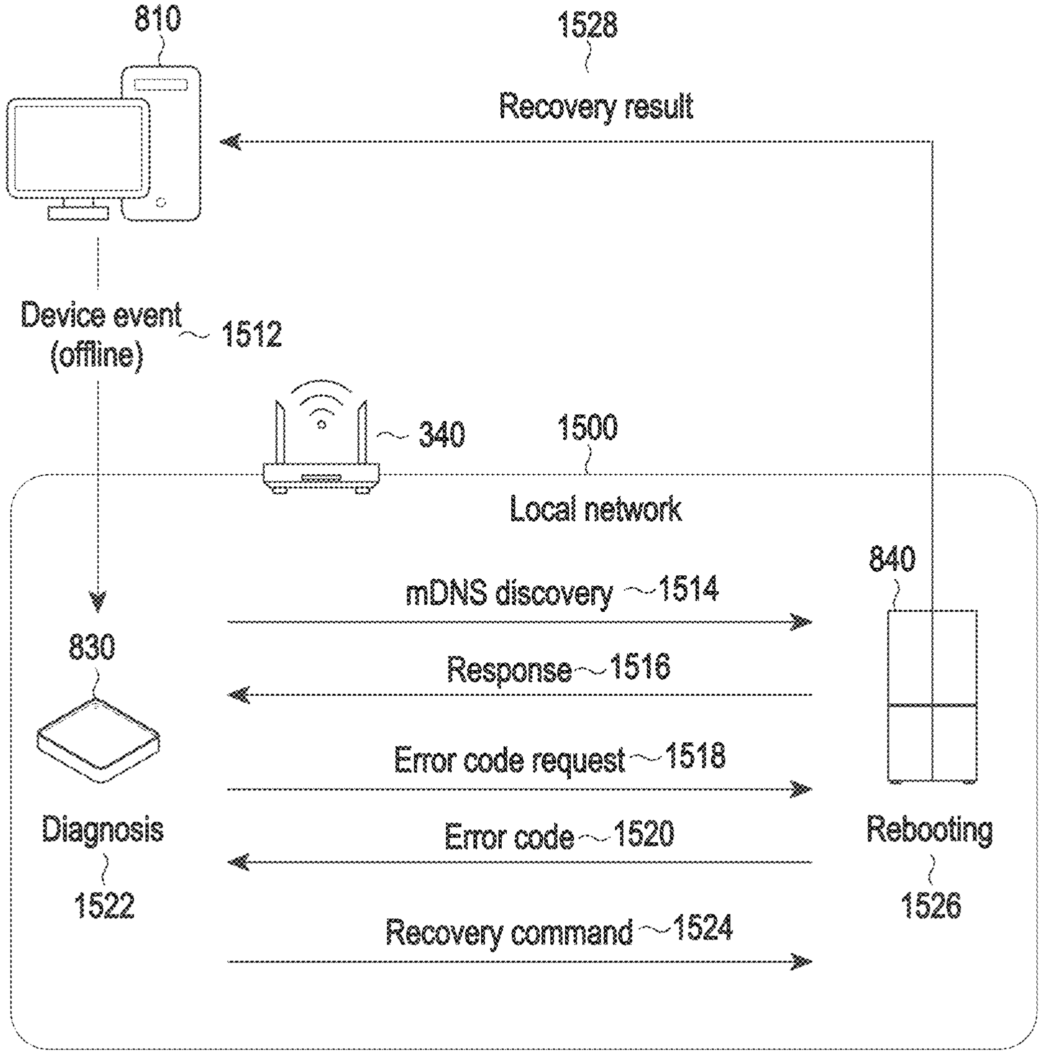
FIG. 15 is a view illustrating offline detection and automatic recovery based on SSE according to an embodiment of the disclosure.

FIG. 15 is a view illustrating offline detection and automatic recovery based on SSE according to an embodiment of the disclosure.

Referring to FIG. 15, the electronic device 830 (e.g., the hub device 330) and the controlled device 840 (e.g., the controlled devices 320*a*, 320*b*, 320*c*, and 320*d*) in the local network 1500 (e.g., the local network 350) may be connected to the server 810 through the AP 340. In operation 1512, the electronic device 830 may receive, from the server 810, a device event (e.g., SSE) indicating the offline state of the controlled device 840 (e.g., the server-offline state in which the connection between the controlled device 840 and the server 810 is disconnected). In an embodiment, the server 810 may transmit the device event to the electronic device 830 based on detecting that the session with the controlled device 840 is disconnected.

In operation 1514, the electronic device 830 may transmit the mDNS service discovery based on the device event. In operation 1516, the controlled device 840 may transmit a response (e.g., an mDNS service discovery response) including the hostname of the controlled device 840 to the electronic device 830 in response to the mDNS service discovery, based on detecting that the connection with the server 810 is disconnected.

In operation 1518, the electronic device 830 may request an error code indicating the cause of being offline from the controlled device 840. In operation 1520, the controlled device 840 may transmit the error code to the electronic device 830. In an embodiment, for requesting the error code and transmitting the error code, the electronic device 830 may establish a D2D connection (e.g., HTTPS connection) with the controlled device 840.

In operation 1522, the electronic device 830 may determine a recovery method corresponding to the error code by executing an offline diagnosis service based on the error code. In operation 1524, the electronic device 830 may transmit a recovery command indicating the recovery method to the controlled device 840. In operation 1526, the controlled device 840 may perform automatic recovery (e.g., rebooting or restarting) according to the recovery method based on the recovery command. In operation 1528, the controlled device 840 may be connected to the AP 340 through the automatic recovery, and may report a recovery result (e.g., connection recovery complete or online state) to the server 810 through the AP 340.

FIG. 16 is a sequence diagram illustrating offline detection and automatic recovery based on SSE according to an embodiment of the disclosure.

Referring to FIG. 16, in operation 1602, the electronic device 830 may subscribe to the SSE service of the server 810. When the controlled device (e.g., the controlled device 840) owned by the electronic device 830 is in the offline state (e.g., the server-offline state in which the connection between the controlled device 840 and the server 810 is disconnected), the SSE service may provide the electronic device 830 with a device event indicating the offline state of the controlled device 840. In operation 1604, the server 810 and the controlled device 840 may detect that the session connected to each other is disconnected. In operation 1606, the controlled device 840 may start an HTTPS server operation based on the session being disconnected. In an embodiment, the domain name for the HTTPS server operation may be a predetermined value, e.g., [last 5 digits of the device ID+calmrecovery.local]. In operation 1608, the server 810 may transmit a device event indicating the offline state of the controlled device 840 to the electronic device 830 according to the SSE service, based on the disconnection of the session.

In operation 1610, the electronic device 830 may obtain the hostname (e.g., domain name) and device information (e.g., device IP address) about the controlled device 840 based on the device ID of the controlled device 840. In an embodiment, the electronic device 830 may obtain the hostname through mDNS search (e.g., mDNS service discovery and response) and may obtain the device IP address and port number of the controlled device 840 using the hostname. The hostname may be determined as a value capable of securing uniqueness, such as [last 5 digits of the device ID+_calmrecovery.local], in order to avoid duplication in the local network 1500 (e.g., the local network 350).

In operation 1612, the electronic device 830 may establish a D2D connection (e.g., HTTPS connection) with the controlled device 840. In an embodiment, the electronic device 830 may transmit an HTTPS connection request to the controlled device 840 based on the device IP address and port number. The electronic device 830 may generate a transport layer security (TLS) session with the controlled device 840 based on the certificate.

In operation 1614, the electronic device 830 may transmit an error code request to the controlled device 840 through the HTTPS connection. In operation 1616, the controlled device 840 may transmit an error code (e.g., {last_error_code: "CE20"}) indicating the cause of being offline to the electronic device 830 through the HTTPS connection. The electronic device 830 may determine a recovery method for the controlled device 840 based on the error code. In an embodiment, the recovery method may be determined based on pre-stored recovery policy information (e.g., Table 2).

In operation 1618, the electronic device 830 may transmit a recovery command to the controlled device 840 through the HTTPS connection. The recovery command may include information (e.g., {"command": "restartThings"}) indicating the recovery method (e.g., restarting) determined based on the error code.

In operation 1620, the controlled device 840 may stop the HTTPS server operation based on receiving the recovery command. In operation 1622, the controlled device 840 may execute the recovery method (e.g., restarting) based on the recovery command. After restarting, the controlled device 840 may be re-connected to the AP 340 based on pre-stored AP information (e.g., SSID and/or password). In operation 1624, the controlled device 840 may transmit a sign-in request to the server 810 through the AP 340. In operation 1626, the server 810 may respond to the controlled device 840 with the sign-in success. In operation 1628, the server 810 may transmit a device event indicating the online state of the controlled device 840 to the electronic device 830 according to the SSE service.

Although not illustrated, when the sign-in to the server 810 fails, the electronic device 830 may determine the recovery failure based on the timeout.

Although not illustrated, in an embodiment, the electronic device 830 may transmit diagnosis data (e.g., diagnosis data in Table 1) related to the diagnosis and recovery results of the controlled device 840 to the server 810.

The automatic recovery based on the BLE scan may use BLE to search, diagnose, and recover a controlled device (e.g., the controlled device 840) disconnected from the AP 340. The electronic device 830 may detect the controlled device 840 being offline through BLE scan and may perform offline diagnosis and recovery based on a device protocol (e.g., open connectivity foundation (OCF) or smartthings software development kit (STDK)).

FIG. 17 is a sequence diagram illustrating offline detection and automatic recovery based on BLE scan according to an embodiment of the disclosure.

Referring to FIG. 17, in operation 1702, the controlled device 840 may be in an online state connected to the server 810 through the AP 340 (not shown). In operation 1704, the controlled device 840 may broadcast an advertising packet (e.g., online ADV) including information (e.g., 'Online bit: 0x01') indicating the online state. In an embodiment, the controlled device 840 may periodically broadcast the online ADV or may broadcast the online ADV only when it is determined that it is necessary. In operation 1706, the electronic device 830 may identify that the controlled device 840 is in the online state, based on identifying that the received advertising packet includes information indicating the online state by periodically performing BLE scan.

In operation 1708, the connection between the controlled device 840 and the server 810 may be disconnected, and in operation 1710, the controlled device 840 may detect that the controlled device 840 is in the offline state (e.g., a server-offline state in which the connection between the controlled device 840 and the server 810 is disconnected). In operation 1712, the controlled device 840 may broadcast an advertising packet (e.g., offline ADV) including information (e.g., 'Online bit: 0x00') indicating the offline state. In an embodiment, the controlled device 840 may periodically broadcast the offline ADV while the device is in the offline state. The electronic device 830 may identify that the controlled device 840 is in the offline state based on identifying that the received advertising packet includes information indicating the offline state through the periodic BLE scan.

In operation 1714, the electronic device 830 may request device information about the controlled device 840 from the server 810 using BLE information about the controlled device 840 obtained through the offline ADV in order to identify that the controlled device 840 is a device owned by the user. The device information is information stored in the server 810 while the controlled device 840 is onboarding, and may include, e.g., information (e.g., a device ID, a BLE media access control (MAC) address and/or a serial number) for identifying the controlled device 840 and/or information indicating the device protocol (e.g., an OCF) of the controlled device 830. In operation 1716, the electronic device 830 may receive a response including device information about the controlled device 840 from the server 810, and may identify that the controlled device 840 is owned by the user based on the device information (e.g., the serial number).

In operation 1718, the electronic device 830 may establish a D2D connection (e.g., OCF connection) with the controlled device 840. In operation 1720, the electronic device 830 may identify ownership of the controlled device 840 with the serial number obtained from the controlled device 840 and may generate a secure session with the controlled device 840.

In operation 1722, the electronic device 830 may transmit an error code request to the controlled device 840 through the D2D connection. In operation 1724, the controlled device 840 may transmit an error code (e.g., {last_error_code: "CE20"}) indicating the cause of being offline to the electronic device 830 through the D2D connection. The electronic device 830 may determine a recovery method for the controlled device 840 based on the error code. In an embodiment, the recovery method may be determined based on pre-stored recovery policy information (e.g., Table 2).

In operation 1726, the electronic device 830 may transmit a recovery command to the controlled device 840 through the D2D connection. The recovery command may include information (e.g., {"command": "restartThings"}) indicating the recovery method (e.g., restarting) determined based on the error code.

In operation 1728, the controlled device 840 may execute the recovery method (e.g., restarting) based on the recovery command. After restarting, the controlled device 840 may be re-connected to the AP 340 based on pre-stored AP information (e.g., SSID and/or password). In operation 1730, the controlled device 840 may transmit a sign-in request to the server 810 through the AP 340. In operation 1732, the server 810 may respond to the controlled device 840 with the sign-in success.

Although not illustrated, in an embodiment, the electronic device 830 may receive, from the server 810, information indicating that the controlled device 840 is in the online state. Although not illustrated, in an embodiment, the electronic device 830 may transmit diagnosis data (e.g., diagnosis data in Table 1) related to the diagnosis and recovery results of the controlled device 840 to the server 810.

In an embodiment of the disclosure, the recovery method for making the controlled device 840 in the offline state online may include a method for leading to user intervention, in addition to methods performed by the controlled device 840 itself, such as restarting or Wi-Fi updating, and the user notification may be used to execute the recovery method for leading to user intervention.

Figure 18:
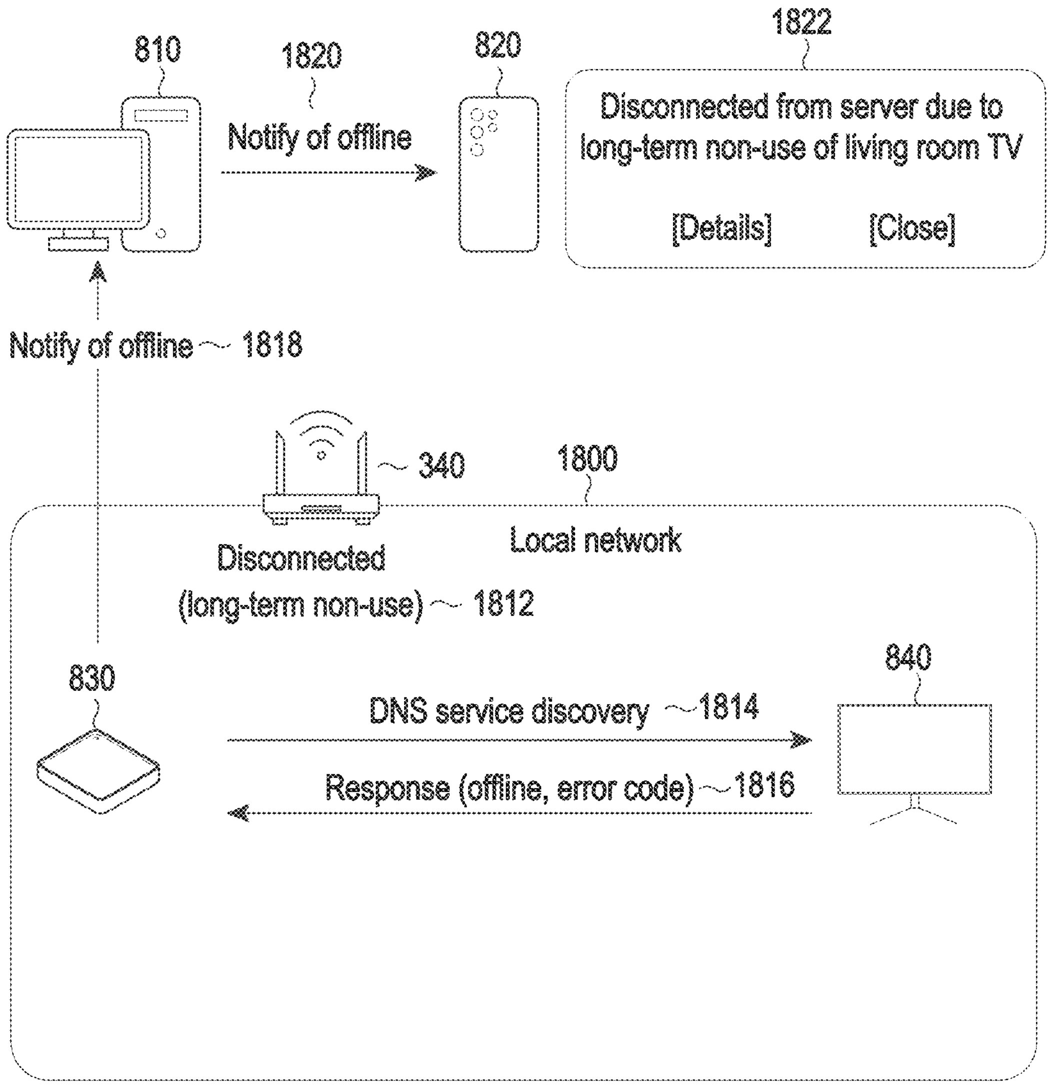
FIG. 18 is a view illustrating a user notification for an offline state according to an embodiment of the disclosure.

FIG. 18 is a view illustrating a user notification for an offline state according to an embodiment of the disclosure.

Referring to FIG. 18, the electronic device 830 (e.g., the hub device 330) and the controlled device 840 (e.g., the controlled devices 320*a*, 320*b*, 320*c*, and 320*d*) in the local network 1800 (e.g., the local network 350) may be connected to the server 810 through the AP 340. Even if there is no problem with the controlled device 840 or the network connection (e.g., the AP 340), the controlled device 840 may be offline due to a policy cause. For example, when the controlled device 840 is not used for a long time, the controlled device 840 may disconnect from the server 810 and become offline. In this case, the electronic device 830 may transmit the user notification to the user device 820 without performing automatic recovery.

In operation 1812, the controlled device 840 may disconnect from the server 810 based on a designated criterion (e.g., long-term non-use) and may be offline. In operation 1814, the electronic device 830 may periodically (e.g., every N minutes) transmit DNS service discovery. In operation 1816, the controlled device 840 may transmit a response (e.g., a DNS service discovery response) including offline state information and an error code to the electronic device 830. Although not illustrated, the electronic device 830 may obtain the error code of the controlled device 840 through BLE scan instead of a DNS search (e.g., DNS service discovery and response).

In operation 1818, the electronic device 830 may transmit the user notification (e.g., offline notification) based on the error code to the server 810. In operation 1820, the server 810 may transfer the offline notification to the user device 820. In operation 1822, the user device 820 may display a guide phrase (e.g., "Disconnected from the server due to long-term non-use of the living room TV") based on the offline notification.

Figure 19:
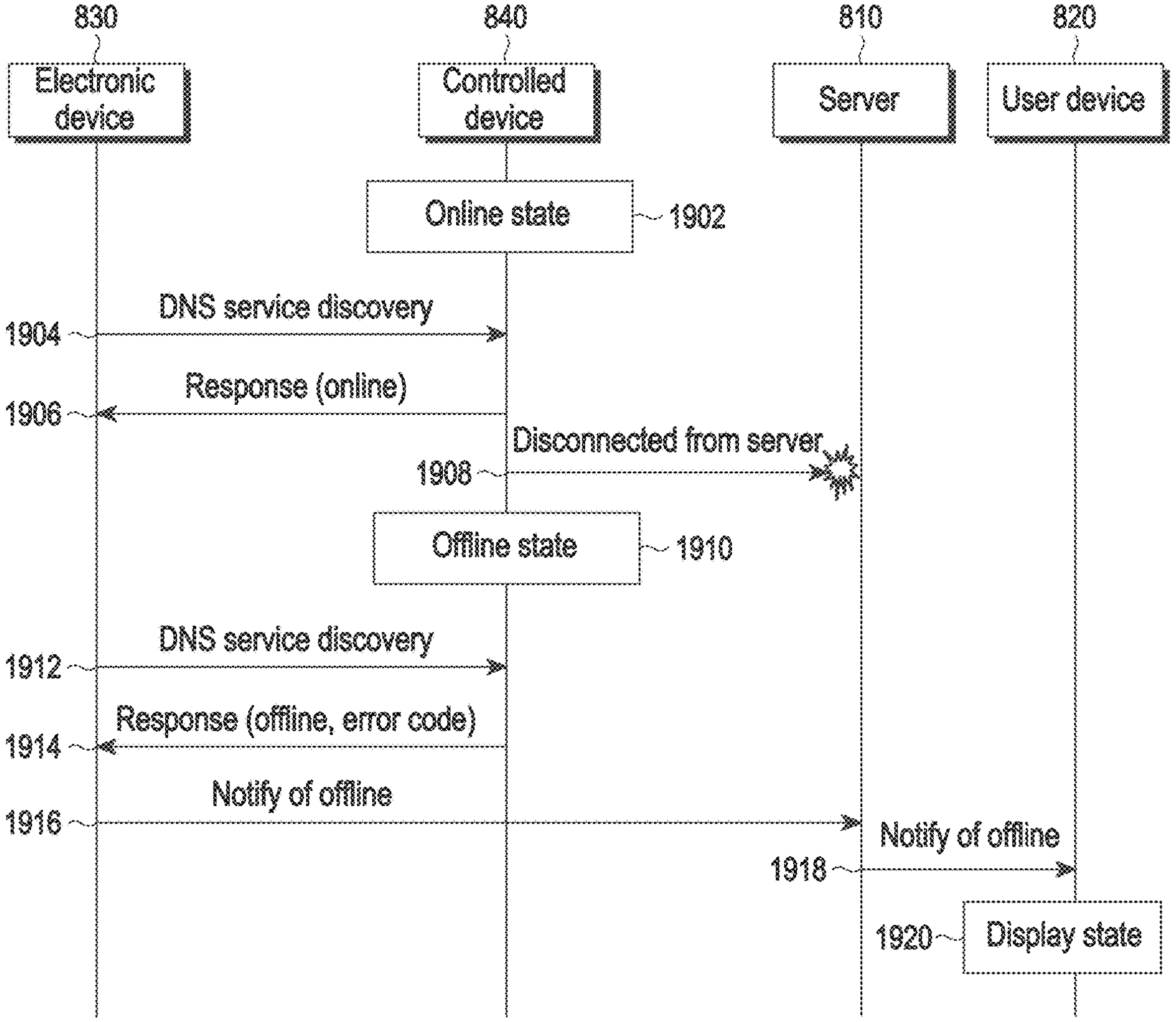
FIG. 19 is a sequence diagram illustrating a user notification through a local network search according to an embodiment of the disclosure.

FIG. 19 is a sequence diagram illustrating a user notification through a local network search according to an embodiment of the disclosure.

Referring to FIG. 19, in operation 1902, the controlled device 840 (e.g., a TV) may be in an online state connected to the server 810 through the AP 340 (not shown). In operation 1904, the electronic device 830 may periodically (e.g., every N minutes) transmit DNS service discovery. The service type of the DNS service discovery may be designated as a value, e.g., [_calmrecovery._tcp.local], designated to detect whether the controlled device 840 is offline.

In operation 1906, the controlled device 840 may transmit, to the electronic device 830, a response (e.g., a DNS service discovery response) including information indicating that the controlled device 840 is in an online state after onboarding on the server 810. In an embodiment, the hostname in the response may be determined as a value capable of securing uniqueness, such as [last 5 digits of the device ID+_calmrecovery.local], in order to avoid duplication in the local network 1800 (e.g., the local network 350). In an embodiment, the response may be configured as shown in Table 3 below.

In operation 1908, the connection (e.g., session) between the controlled device 840 and the server 810 may be disconnected, and in operation 1910, the controlled device 840 may detect that the controlled device 840 is in the offline state (e.g., a server-offline state in which the connection between the controlled device 840 and the server 810 is disconnected). In operation 1912, the electronic device 830 may transmit DNS service discovery according to a designated period. In operation 1914, the controlled device 840 may transmit, to the electronic device 830, a response (e.g., a DNS service discovery response) including information indicating the offline state (e.g., "Online=false"), an error code (e.g., "LastErrorCode=DS01-1"), and/or a device identifier, based on detecting that the electronic device 840 is in the offline state. The electronic device 830 may determine that the recovery method for the controlled device 840 is the user notification based on the error code in the response. In an embodiment, the recovery method may be determined based on pre-stored recovery policy information (e.g., Table 2).

Although not illustrated, in an embodiment of the disclosure, the electronic device 830 may obtain the error code of the controlled device 840 through BLE scan (e.g., operations 1706, 1712, 1714, 1716, 1718, 1720, 1722, and 1724) instead of local network search (e.g., operations 1904, 1906, 1912, and 1914) and proceed to operation 1916.

In operation 1916, the electronic device 830 may transmit the user notification (e.g., offline notification) based on the error code to the server 810. In operation 1918, the server 810 may transfer the offline notification to the user device 820. In operation 1920, the user device 820 may display a guide phrase (e.g., "Disconnected from the server due to long-term non-use of the living room TV") describing the offline state based on the offline notification.

Although not illustrated, in an embodiment, the electronic device 830 may transmit diagnosis data (e.g., diagnosis data in Table 1) related to the diagnosis and recovery results of the controlled device 840 to the server 810.

In an embodiment of the disclosure, when the controlled device 840 is offline due to a change in AP information (e.g., SSID and/or password), automatic recovery and user notification may be performed.

Figure 20:
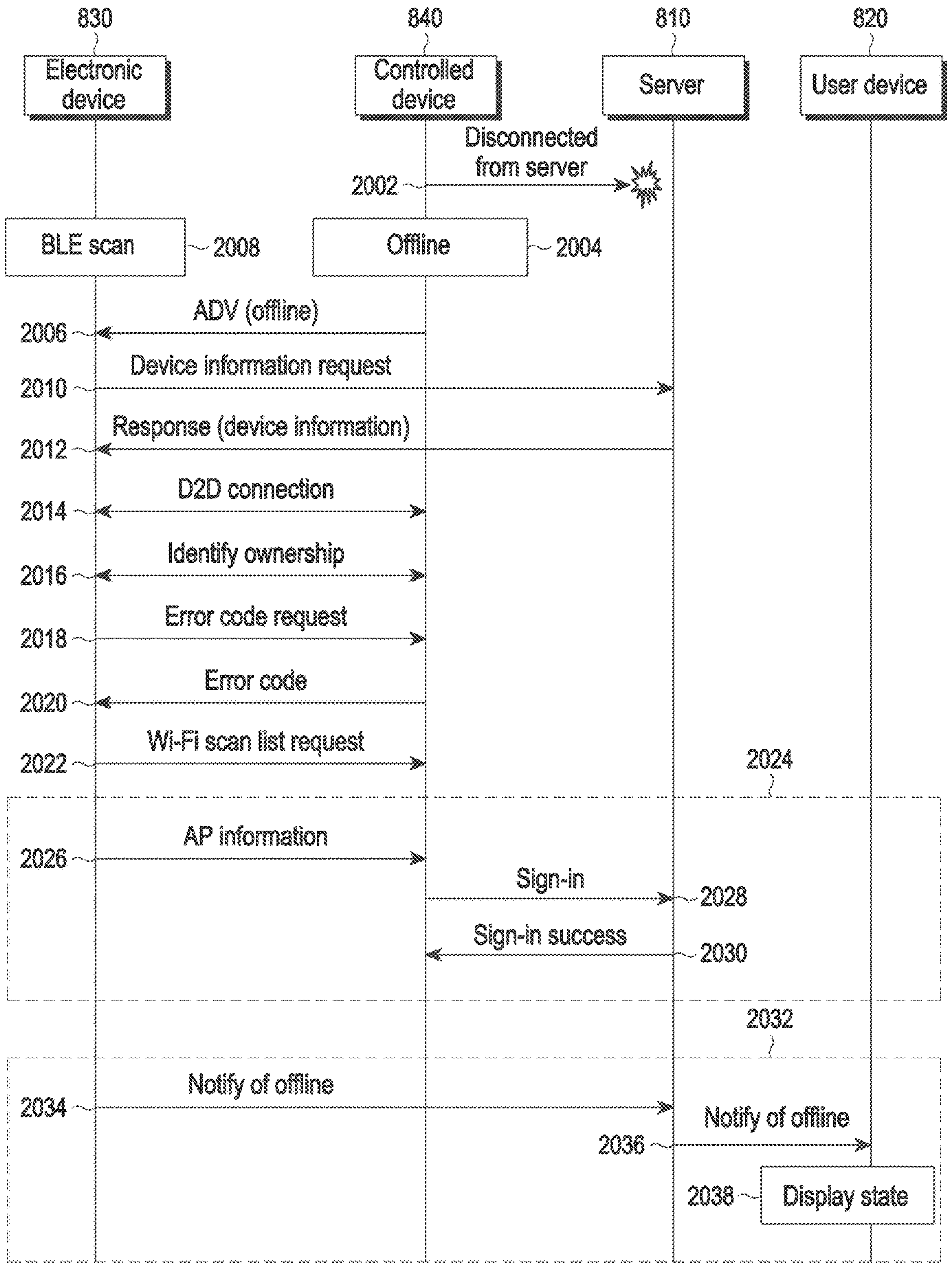
FIG. 20 is a sequence diagram illustrating a user notification for a Wi-Fi update according to an embodiment of the disclosure.

FIG. 20 is a sequence diagram illustrating a user notification for a Wi-Fi update according to an embodiment of the disclosure.

Referring to FIG. 20, in operation 2002, the connection between the controlled device 840 (e.g., a washer) and the server 810 may be disconnected, and in operation 2004, the controlled device 840 may detect that the controlled device 840 is in the offline state (e.g., a server-offline state in which the connection between the controlled device 840 and the server 810 is disconnected). In operation 2006, the controlled device 840 may broadcast an advertising packet (e.g., offline ADV) including information (e.g., 'Online bit: 0x00') indicating the offline state. In an embodiment, the controlled device 840 may periodically broadcast the offline ADV while the device is in the offline state. In operation 2008, the electronic device 830 may perform a periodic BLE scan to detect the controlled device 840 being offline. The electronic device 830 may receive the offline ADV through the periodic BLE scan and may identify that the controlled device 840 is in the offline state.

In operation 2010, the electronic device 830 may request device information about the controlled device 840 from the server 810 using BLE information about the controlled device 840 obtained through the offline ADV in order to identify that the controlled device 840 is a device owned by the user. The device information is information stored in the server 810 while the controlled device 840 is onboarding, and may include, e.g., information (e.g., a device ID, a BLE MAC address and/or a serial number) for identifying the controlled device 840 and/or information indicating the device protocol (e.g., an OCF) of the controlled device 830. In operation 2012, the electronic device 830 may receive a response including device information about the controlled device 840 from the server 810, and may identify that the controlled device 840 is owned by the user based on the device information (e.g., the serial number).

In operation 2014, the electronic device 830 may establish a D2D connection (e.g., OCF connection) with the controlled device 840. In operation 2016, the electronic device 830 may identify ownership of the controlled device 840 with the serial number obtained from the controlled device 840 and may generate a secure session with the controlled device 840.

In operation 2018, the electronic device 830 may transmit an error code request to the controlled device 840 through the D2D connection. In operation 2020, the controlled device 840 may transmit an error code (e.g., {last_error_code: "NE11-1"}) indicating the cause of being offline to the electronic device 830 through the D2D connection. The electronic device 830 may determine that the recovery method for the controlled device 840 is the user notification based on the error code. In an embodiment, the recovery method may be determined based on pre-stored recovery policy information (e.g., Table 2).

In operation 2022, the electronic device 830 may request a Wi-Fi scan list including scannable Wi-Fi devices (e.g., APs) from the controlled device 840 and may obtain the Wi-Fi scan list including the APs scanned by the controlled device 840. In an embodiment, the Wi-Fi scan list may include AP information (e.g., SSID, password, authentication type, and/or encryption type) about each AP scanned by the controlled device 840. When an AP (e.g., the AP 340) to which the electronic device 830 is connected is included in the Wi-Fi scan list received from the controlled device 840, operation 2024 may be performed. On the other hand, when the AP (e.g., the AP 340) to which the electronic device 830 is connected is not included in the Wi-Fi scan list received from the controlled device 840, operation 2032 may be performed.

Operation 2024 may include operations 2026, 2028, and 2030. In operation 2026, the electronic device 830 may transmit AP information (e.g., SSID and/or password) about the AP 340 to the controlled device 840. In operation 2028, the controlled device 840 may connect to the AP 340 using the AP information and may transmit a sign-in request to the server 810 through the AP 340. In operation 2030, the server 810 may respond to the controlled device 840 with the sign-in success.

Operation 2032 may include operations 2034, 2036, and 2038. In operation 2034, the electronic device 830 may transmit the user notification (e.g., offline notification) related to the controlled device 840 to the server 810. In operation 2036, the server 810 may transfer the offline notification to the user device 820 (e.g., the electronic device 201). In operation 2038, the user device 820 may display a guide phrase (e.g., "Washer disconnected due to failure in discovery an AP") for describing the offline state, based on the offline notification.

Although not illustrated, in an embodiment, the electronic device 830 may transmit diagnosis data (e.g., diagnosis data in Table 1) related to the diagnosis and recovery results of the controlled device 840 to the server 810.

In an embodiment of the disclosure, when the electronic device 830 is offline, the electronic device 830 may not normally diagnose whether a nearby controlled device (e.g., the controlled devices 320*a*, 320*b*, 320*c*, and 320*d*) is offline. When the electronic device 830 is offline, the electronic device 830 by itself may diagnose the cause of disconnection and recover the connection.

Figure 21:
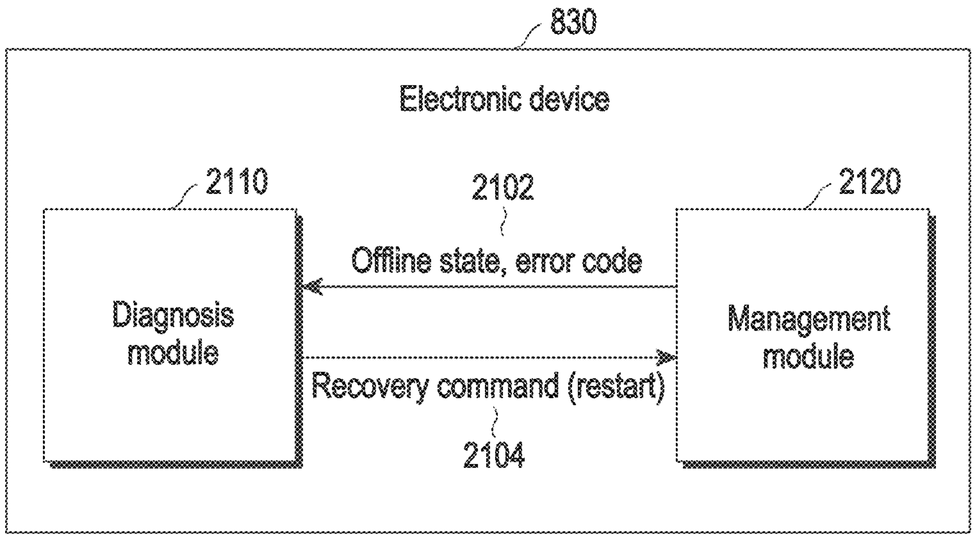
FIG. 21 is a view illustrating a self offline cause diagnosis and recovery operation according to an embodiment of the disclosure.

FIG. 21 is a view illustrating a self offline cause diagnosis and recovery operation according to an embodiment of the disclosure.

Referring to FIG. 21, an electronic device 830 may include a diagnosis module 2110 (e.g., the diagnosis module 832) for performing diagnosis and recovery according to an offline diagnosis service of controlled devices (e.g., the controlled devices 320*a*, 320*b*, 320*c*, and 320*d*) and a management module 2120 for managing connection and operation of the controlled devices. The diagnosis module 2110 and the management module 2120 may be driven as separate processes to ensure independence of operations.

When the management module 2120 is offline, the management module 2120 may transmit a signal 2102 including an offline state and an error code (e.g., "DS01-1") to the diagnosis module 2110. Considering that the process of the management module 2120 is forcibly terminated, the diagnosis module 2110 may periodically transmit a polling signal for identifying whether the management module 2120 is offline.

The diagnosis module 2110 may determine a recovery method according to recovery policy information indicating a recovery method for each error code in relation to the error code, and may transmit a recovery command 2104 indicating the recovery method (e.g., restarting) to the management module 2120. The management module 2120 may restart based on the recovery command 2104, and may be connected to the server 810 through the AP 340 after restarting.

An electronic device 830 according to an embodiment of the disclosure may comprise a transceiver 420 configured to receive and transmit signals, one or more processors 410 communicatively coupled with the transceiver, and memory 430 storing instructions. The instructions, when executed by the one or more processors, cause the electronic device to obtain first information indicating that a controlled device 840 is in an offline state in which the controlled device is disconnected from a server 810. The instructions, when executed by the one or more processors, cause the electronic device to establish a device-to-device (D2D) connection with the controlled device through the transceiver. The instructions, when executed by the one or more processors, cause the electronic device to receive an error code related to the offline state of the controlled device from the controlled device through the D2D connection. The instructions, when executed by the one or more processors, cause the electronic device to determine a recovery method corresponding to the error code based on designated recovery policy information. The instructions, when executed by the one or more processors, cause the electronic device to transmit, to the controlled device through the transceiver, a recovery command instructing to recover a connection between the controlled device and the server based on the determined recovery method.

In an embodiment, the designated recovery policy information may comprise information about one or more recovery methods corresponding to a plurality of error codes related to the controlled device.

In an embodiment, the instructions cause the electronic device to receive, from the server, the first information including a device event indicating that the controlled device is in the offline state.

In an embodiment, the instructions cause the electronic device to periodically transmit a domain name service (DNS) service discovery and receive, from the controlled device, a service discovery response including the first information indicating the offline state in response to the DNS service discovery.

In an embodiment, the instructions cause the electronic device to receive an advertising packet broadcast from the controlled device through a Bluetooth low energy scan and identify that the advertising packet includes the first information indicating the offline state.

In an embodiment, the instructions cause the electronic device to request device information related to the controlled device from the server based on identifying that the advertising packet includes the first information, receive, from the server, the device information for use in the D2D connection, and identify ownership of the controlled device based on a serial number included in the device information.

In an embodiment, the instructions cause the electronic device to periodically transmit a domain name service (DNS) service discovery and receive, from the controlled device, a service discovery response including the first information indicating the offline state and the error code in response to the DNS service discovery.

In an embodiment, the D2D connection may comprises at least one of a DNS search-based hypertext transfer protocol over secure connection, a BLE connection, or a Wi-Fi connection.

In an embodiment, the instructions cause the electronic device to determine whether the determined recovery method indicates that automatic recovery of the offline state is possible and, when the automatic recovery is not possible, transmit, to a user device 820 through the server, a user notification requesting to display a guide phrase related to the offline state.

In an embodiment, the instructions cause the electronic device to transmit, to the server, diagnosis data indicating a cause or recovery result of the offline state.

A method performed by an electronic device 830 according to an embodiment of the disclosure may include obtaining (915) by the electronic device first information indicating that a controlled device 840 is in an offline state in which the controlled device is disconnected from a server 810. The method may include establishing (920) by the electronic device a D2D connection with the controlled device. The method may include receiving (925) by the electronic device an error code related to the offline state of the controlled device from the controlled device through the D2D connection. The method may include determining (930) by the electronic device a recovery method corresponding to the error code based on designated recovery policy information. The method may include transmitting (935, 945) by the electronic device, to the controlled device, a recovery command instructing to recover a connection between the controlled device and the server based on the determined recovery method.

In an embodiment, the designated recovery policy information may include information about one or more recovery methods corresponding to a plurality of error codes related to the controlled device.

In an embodiment, the obtaining of the first information may include receiving, from the server, the first information including a device event indicating that the controlled device is in the offline state.

In an embodiment, the obtaining of the first information may include periodically transmitting a domain name service (DNS) service discovery and receiving, from the controlled device, a service discovery response including the first information indicating the offline state in response to the DNS service discovery.

In an embodiment, the obtaining of the first information may include receiving an advertising packet broadcast from the controlled device through a Bluetooth low energy scan and identifying that the advertising packet includes the first information indicating the offline state.

In an embodiment, the method may include requesting device information related to the controlled device from the server based on identifying that the advertising packet includes the first information, receiving, from the server, the device information for use in the D2D connection, and identifying ownership of the controlled device based on a serial number included in the device information.

In an embodiment, the obtaining of the first information and the receiving of the error code may include periodically transmitting a domain name service (DNS) service discovery and receiving, from the controlled device, a service discovery response including the first information indicating the offline state and the error code in response to the DNS service discovery.

In an embodiment, the D2D connection may include at least one of a DNS search-based hypertext transfer protocol over secure connection, a BLE connection, or a Wi-Fi connection.

In an embodiment, the method may include determining whether the determined recovery method indicates that automatic recovery of the offline state is possible and, when the automatic recovery is not possible, transmitting, to a user device (820) through the server, a user notification requesting to display a guide phrase related to the offline state.

In an embodiment, the method may include transmitting, to the server, diagnosis data indicating a cause or recovery result of the offline state.

One or more non-transitory computer-readable storage media store one or more computer programs including computer-executable instructions that, when executed by one or more processors 410 of an electronic device 830, cause the electronic device to perform operations. The operations comprises: obtaining, by the electronic device, first information indicating that a controlled device 840 is in an offline state in which the controlled device is disconnected from a server 810, establishing, by the electronic device, a device-to-device (D2D) connection with the controlled device, receiving, by the electronic device, an error code related to the offline state of the controlled device from the controlled device through the D2D connection, determining, by the electronic device, a recovery method corresponding to the error code based on designated recovery policy information, and transmitting, by the electronic device, to the controlled device, a recovery command instructing to recover a connection between the controlled device and the server based on the determined recovery method.

In an embodiment, the designated recovery policy information may comprise information about one or more recovery methods corresponding to a plurality of error codes related to the controlled device.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic device comprising:

a transceiver configured to receive and transmit signals;

one or more processors communicatively coupled with the transceiver; and memory storing instructions, wherein the instructions, when executed by the one or more processors individually or collectively, cause the electronic device to:

obtain, from a controlled device, through a Bluetooth low energy (BLE) scan or through local network search, first information indicating that the controlled device is in an offline state in which the controlled device is disconnected from a server, based on obtaining the first information, establish a device-to-device (D2D) connection with the controlled device through the transceiver, receive an error code related to the offline state of the controlled device from the controlled device through the D2D connection, determine a recovery method corresponding to the error code based on designated recovery policy information, and transmit, to the controlled device through the transceiver, a recovery command instructing to recover a connection between the controlled device and the server based on the determined recovery method.

2. The electronic device of claim 1, wherein the designated recovery policy information comprises:

information about one or more recovery methods corresponding to a plurality of error codes related to the controlled device.

3. The electronic device of claim 1, wherein the instructions, when executed by the one or more processors individually or collectively, further cause the electronic device to:

receive, from the server, the first information including a device event indicating that the controlled device is in the offline state.

4. The electronic device of claim 1, wherein the instructions cause the electronic device to:

periodically transmit a domain name service (DNS) service discovery, and receive, from the controlled device, a service discovery response including the first information indicating the offline state in response to the DNS service discovery.

5. The electronic device of claim 1, wherein the instructions, when executed by the one or more processors individually or collectively, further cause the electronic device to:

receive an advertising packet broadcast from the controlled device through the BLE scan, and identify that the advertising packet includes the first information indicating the offline state.

6. The electronic device of claim 5, wherein the instructions, when executed by the one or more processors individually or collectively, further cause the electronic device to:

request device information related to the controlled device from the server based on identifying that the advertising packet includes the first information, receive, from the server, the device information for use in the D2D connection, and identify ownership of the controlled device based on a serial number included in the device information.

7. The electronic device of claim 1, wherein the instructions, when executed by the one or more processors individually or collectively, further cause the electronic device to:

periodically transmit a domain name service (DNS) service discovery, and receive, from the controlled device, a service discovery response including the first information indicating the offline state and the error code in response to the DNS service discovery.

8. The electronic device of claim 1, wherein the D2D connection comprises:

at least one of a domain name service (DNS) search-based hypertext transfer protocol over secure (HTTPS) connection, a Bluetooth low energy (BLE) connection, or a Wi-Fi connection.

9. The electronic device of claim 1, wherein the instructions, when executed by the one or more processors individually or collectively, further cause the electronic device to:

determine whether the determined recovery method indicates that automatic recovery of the offline state is possible, and when the automatic recovery is not possible, transmit, to a user device through the server, a user notification requesting to display a guide phrase related to the offline state.

10. The electronic device of claim 1, wherein the instructions, when executed by the one or more processors individually or collectively, further cause the electronic device to:

transmit, to the server, diagnosis data indicating a cause or recovery result of the offline state.

11. A method performed by an electronic device, the method comprising:

obtaining, from a controlled device, through a Bluetooth low energy (BLE) scan or through local network search, first information indicating that the controlled device is in an offline state in which the controlled device is disconnected from a server;

based on obtaining the first information, establishing, by the electronic device, a device-to-device (D2D) connection with the controlled device;

receiving, by the electronic device, an error code related to the offline state of the controlled device from the controlled device through the D2D connection;

determining, by the electronic device, a recovery method corresponding to the error code based on designated recovery policy information; and transmitting, by the electronic device, to the controlled device, a recovery command instructing to recover a connection between the controlled device and the server based on the determined recovery method.

12. The method of claim 11, wherein the designated recovery policy information comprises:

information about one or more recovery methods corresponding to a plurality of error codes related to the controlled device.

13. The method of claim 11, wherein the obtaining of the first information comprises:

receiving, from the server, the first information including a device event indicating that the controlled device is in the offline state.

14. The method of claim 11, wherein the obtaining of the first information comprises:

periodically transmitting a domain name service (DNS) service discovery; and receiving, from the controlled device, a service discovery response including the first information indicating the offline state in response to the DNS service discovery.

15. The method of claim 11, wherein the obtaining of the first information comprises:

receiving an advertising packet broadcast from the controlled device through the BLE scan; and identifying that the advertising packet includes the first information indicating the offline state.

16. The method of claim 15, further comprising:

requesting device information related to the controlled device from the server based on identifying that the advertising packet includes the first information;

receiving, from the server, the device information for use in the D2D connection; and identifying ownership of the controlled device based on a serial number included in the device information.

17. The method of claim 11, wherein the obtaining of the first information and the receiving of the error code include comprises:

periodically transmitting a domain name service (DNS) service discovery; and receiving, from the controlled device, a service discovery response including the first information indicating the offline state and the error code in response to the DNS service discovery.

18. The method of claim 11, wherein the D2D connection includes comprises:

at least one of a domain name service (DNS) search-based hypertext transfer protocol over secure (HTTPS) connection, a Bluetooth low energy (BLE) connection, or a Wi-Fi connection.

19. The method of claim 11, further comprising:

determining whether the determined recovery method indicates that automatic recovery of the offline state is possible; and when the automatic recovery is not possible, transmitting, to a user device through the server, a user notification requesting to display a guide phrase related to the offline state.

20. The method of claim 11, further comprising:

transmitting, to the server, diagnosis data indicating a cause and/or or recovery result of the offline state.

* * * * *